(12) United States Patent
Vetters et al.

(10) Patent No.: US 10,731,481 B2
(45) Date of Patent: Aug. 4, 2020

(54) TURBINE BLADE WITH CERAMIC MATRIX COMPOSITE MATERIAL CONSTRUCTION

(71) Applicants: Rolls-Royce Corporation, Indianapolis, IN (US); Rolls-Royce North American Technologies, Inc., Indianapolis, IN (US)

(72) Inventors: Daniel K. Vetters, Indianapolis, IN (US); Ted J. Freeman, Danville, IN (US); James Glen Schwefel, Fishers, IN (US); Phil Bastnagel, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 989 days.

(21) Appl. No.: 15/340,663

(22) Filed: Nov. 1, 2016

(65) Prior Publication Data
US 2018/0230826 A1    Aug. 16, 2018

(51) Int. Cl.
| F01D 5/28 | (2006.01) |
|---|---|
| F01D 5/30 | (2006.01) |
| F01D 5/18 | (2006.01) |
| F01D 11/00 | (2006.01) |

(52) U.S. Cl.
CPC ............ *F01D 5/284* (2013.01); *F01D 5/187* (2013.01); *F01D 5/282* (2013.01); *F01D 5/3084* (2013.01); *F01D 11/008* (2013.01); *F01D 5/18* (2013.01); *F01D 5/3053* (2013.01); *F05D 2220/32* (2013.01); *F05D 2240/15* (2013.01); *F05D 2240/30* (2013.01); *F05D 2260/20* (2013.01); *F05D 2300/2283* (2013.01); *F05D 2300/6033* (2013.01); *Y02T 50/672* (2013.01); *Y02T 50/676* (2013.01)

(58) Field of Classification Search
CPC ........ F01D 5/284; F01D 11/008; F01D 5/282; F01D 5/187; F01D 5/3084; F01D 5/3053; F01D 5/18; F01D 5/147; Y02T 50/672; Y02T 50/676; F05D 2300/2283; F05D 2240/30; F05D 2240/15; F05D 2260/20; F05D 2220/32; F05D 2300/6033
See application file for complete search history.

(56) References Cited

U.S. PATENT DOCUMENTS

| 2,479,057 | A | * | 8/1949 | Bodger | .................... F01D 5/021 416/191 |
|---|---|---|---|---|---|
| 3,810,711 | A | * | 5/1974 | Emmerson | .............. F01D 5/184 416/97 R |

(Continued)

FOREIGN PATENT DOCUMENTS

| EP | 2210733 A1 | 7/2010 |
|---|---|---|
| FR | 2943942 A1 | 10/2010 |

(Continued)

*Primary Examiner* — Dwayne J White
*Assistant Examiner* — Adam W Brown
(74) *Attorney, Agent, or Firm* — Barnes & Thornburg LLP

(57) ABSTRACT

A turbine-blade assembly for use in a gas turbine engine is disclosed. The turbine-blade assembly includes an attachment body, a heat shield, and a retainer. The heat shield surrounds a portion of the attachment body. The retainer is configured to retain the heat shield on the turbine-blade assembly.

16 Claims, 9 Drawing Sheets

(56) References Cited

U.S. PATENT DOCUMENTS

| | | | | |
|---|---|---|---|---|
| 4,512,719 | A * | 4/1985 | Rossmann | F01D 5/284 416/241 B |
| 4,519,745 | A * | 5/1985 | Rosman | F01D 5/284 416/241 B |
| 4,563,128 | A * | 1/1986 | Rossmann | F01D 5/284 416/92 |
| 7,080,971 | B2 * | 7/2006 | Wilson | F01D 5/147 416/92 |
| 7,094,021 | B2 * | 8/2006 | Haubert | F01D 5/147 415/115 |
| 7,510,379 | B2 | 3/2009 | Marusko et al. | |
| 7,713,029 | B1 * | 5/2010 | Davies | F01D 5/025 416/204 R |
| 7,993,104 | B1 * | 8/2011 | Ewing, Jr. | F01D 5/147 416/226 |
| 8,100,653 | B2 * | 1/2012 | Gerakis | F01D 5/147 416/97 R |
| 8,142,163 | B1 * | 3/2012 | Davies | F01D 5/147 416/225 |
| 8,607,454 | B2 | 12/2013 | Blanchard et al. | |
| 9,505,145 | B2 | 11/2016 | McCaffrey et al. | |
| 2007/0148000 | A1 | 6/2007 | Marusko et al. | |
| 2011/0027098 | A1 | 2/2011 | Noe et al. | |
| 2011/0229326 | A1 | 9/2011 | Papin et al. | |
| 2012/0189427 | A1 * | 7/2012 | Kwon | F01D 5/20 415/1 |
| 2013/0004326 | A1 | 1/2013 | McCaffrey | |
| 2015/0042023 | A1 | 2/2015 | McCaffrey et al. | |
| 2015/0345314 | A1 | 12/2015 | Davidson et al. | |

FOREIGN PATENT DOCUMENTS

| | | |
|---|---|---|
| WO | 2010061140 A1 | 6/2010 |
| WO | 2014165467 A1 | 10/2014 |
| WO | 2014197233 A1 | 12/2014 |
| WO | 2015053911 A1 | 4/2015 |
| WO | 2015047485 A3 | 6/2015 |

* cited by examiner

TURBINE BLADE WITH CERAMIC MATRIX COMPOSITE MATERIAL CONSTRUCTION

FIELD OF THE DISCLOSURE

The present disclosure relates generally to turbine-blade assemblies for gas turbine engines, and more specifically to turbine-blade assemblies that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, fuel is mixed with the high-pressure air and is ignited. Hot, high-pressure products of the combustion reaction in the combustor are directed into the turbine where work is extracted to drive the compressor and, sometimes, an output shaft. Leftover products of the combustion are exhausted out of the turbine and may provide thrust in some applications.

Turbine blades interact with the hot, high-pressure products of the combustor and convert them to mechanical rotation. The interaction of combustion products with the blades heats the blades. Turbine blades are often made from high-temperature compatible materials and/or are actively cooled by supplying relatively cool air to the turbine blades. To this end, some airfoils incorporate composite materials or heat shields to withstand very high temperatures. Design and manufacture of turbine blades from composite materials presents challenges because of the geometry and strength required for the parts.

SUMMARY

The present disclosure may comprise one or more of the following features and combinations thereof.

According to the present disclosure, a turbine-blade assembly adapted for use in a gas turbine engine may include an attachment body, a heat shield, and a retainer configured to couple the heat shield to the attachment body. The attachment body may comprise metallic material and may be configured to couple the turbine-blade assembly to a disk of a turbine rotor. The attachment body may be formed to include a platform and at least a portion of a root. The heat shield may comprise ceramic materials and may be shaped to form a portion of an airfoil.

In illustrative embodiments, the retainer may include a cap, a spar coupled to the cap and extending through the heat shield, and a stem coupled to the spar and configured to form part of the root. The cap may cooperate with the platform to locate the heat shield therebetween and to retain the heat shield relative to the root.

In illustrative embodiments, the cap is arranged to overlie the heat shield to locate the heat shield between a bottom surface of the cap and a top surface of the platform. The bottom surface of the cap cooperates with the top surface of the platform, an inner surface of the heat shield, and an outer surface of the spar to define a cavity. The retainer is formed to include a vent aperture in fluid communication with the cavity. The cavity is in fluid communication with a rotor when the turbine-blade assembly is in the gas turbine engine to receive cooling air from elsewhere in the gas turbine engine.

In illustrative embodiments, the cap includes a load pad extending downwardly from the bottom surface of the cap. The load pad is configured to contact the heat shield to locate the heat shield relative to the spar.

In illustrative embodiments, the attachment body includes a first part and a second part arranged to locate a portion of the retainer therebetween. Each of the first part and the second part are formed to include an aperture sized to receive a dowel that extends from the first part through the retainer to the second part.

In illustrative embodiments, the turbine-blade assembly may include a rim coupled to the heat shield that cooperates with the cap of the retainer and the heat shield to define a vent groove. An inner surface of the rim is generally coplanar with an outer surface of the heat shield. An outer surface of the rim is generally coplanar with an outer surface of the heat shield. The rim includes a top surface that is generally coplanar with a top surface of the cap. The cap is formed to include a groove aperture that opens into the groove to carry cooling air into the groove.

According to another aspect of the present disclosure, another turbine-blade assembly adapted for use in a gas turbine engine may include an attachment body configured to couple the turbine-blade assembly to a disk of a turbine rotor, a heat shield comprising ceramic matrix composite materials and having an airfoil shape that extends around the spar of the attachment body, and a retainer configured to couple the heat shield to the attachment body. The attachment body may be formed to include a platform and a spar.

In illustrative embodiments, the retainer may be coupled to the spar at a distal end of the turbine-blade assembly to locate the heat shield between the platform and the retainer. The retainer may thus hold the heat shield in place relative to the attachment body.

In illustrative embodiments, the retainer includes a coupler flange. The coupler flange may be arranged to be coupled to an inner surface of the spar.

In illustrative embodiments, the retainer includes a spar mount configured to receive a portion of the spar therethrough to couple with an outer surface of the spar. The spar includes a top surface that is generally coplanar with a top surface of the retainer.

According to another aspect of the present disclosure, a method of assembling an turbine-blade assembly is taught. The turbine-blade assembly may include an airfoil and an attachment body for use in a gas turbine engine.

In illustrative embodiments, the method may include arranging a ceramic heat shield around a portion of a metallic spar to cause the heat shield surround the metallic spar, and coupling a retainer to the attachment body to locate the ceramic heat shield between the retainer and a platform of the attachment body.

In illustrative embodiments, the step of coupling includes bicasting the retainer with the spar. In illustrative embodiments, the retainer is formed to include a spar mount configured to receive the spar therethrough and the step of coupling includes brazing the spar with the retainer These and other features of the present disclosure will become more apparent from the following description of the illustrative embodiments.

DETAILED DESCRIPTION OF THE DRAWINGS

Figure 1:
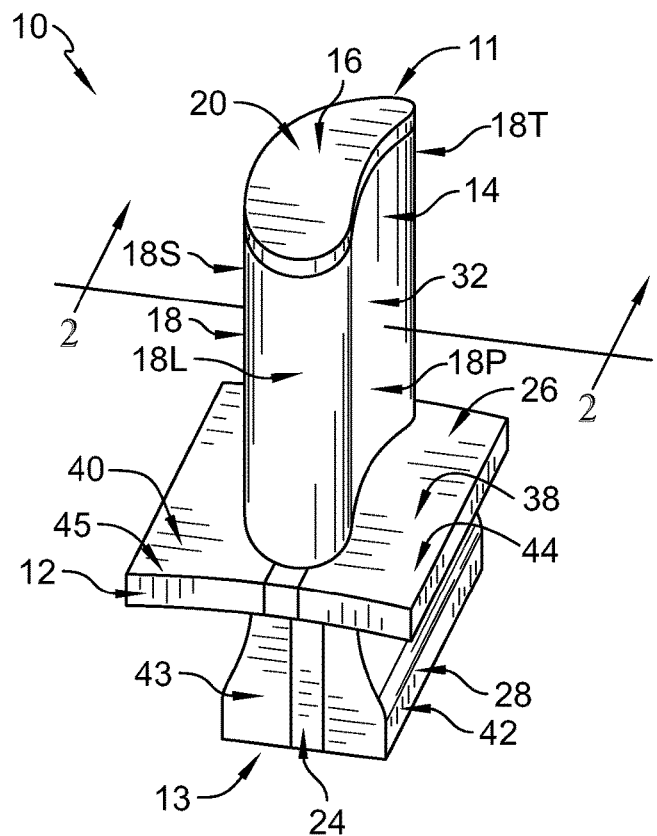
FIG. 1 is a perspective view of a turbine-blade assembly in accordance with the present disclosure, showing that the turbine-blade assembly includes an attachment body forming a platform and part of a root, a heat shield, and a retainer coupled to the attachment body to locate the heat shield between the retainer and the platform of the attachment body.

For the purposes of promoting an understanding of the principles of the disclosure, reference will now be made to a number of illustrative embodiments illustrated in the drawings and specific language will be used to describe the same.

Figure 2:
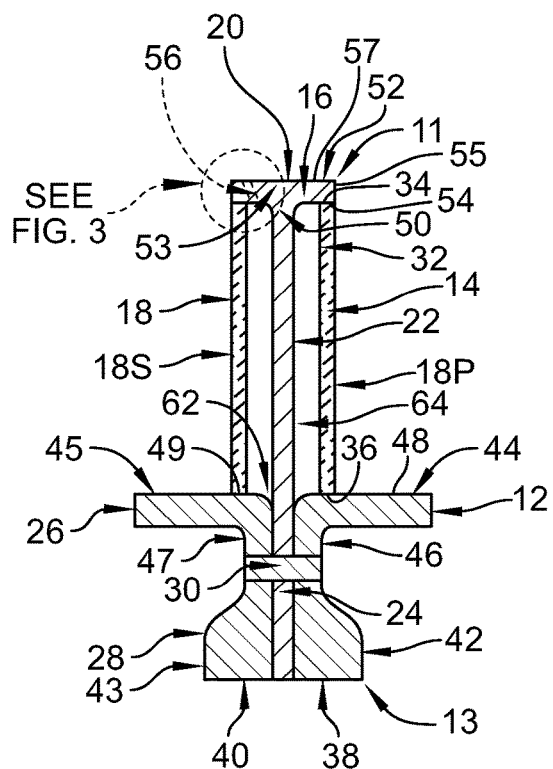
FIG. 2 is a sectional view taken along line 2-2 of FIG. 1, showing the retainer extends from a distal end of the turbine-blade assembly to a proximal end of the turbine-blade assembly to form a spar, and further showing the spar located between a pressure side segment of the heat shield and a suction side segment of the heat shield.
Figure 3:
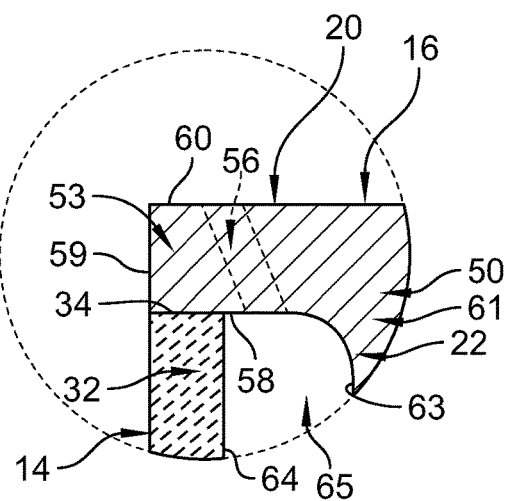
FIG. 3 is a detailed view of a portion of FIG. 2 showing a cap of the retainer overlying a portion of the heat shield, and further showing the cap may optionally include a vent aperture.

An illustrative turbine-blade assembly 10 is shown in FIGS. 1-3. The turbine-blade assembly 10 includes an attachment body 12, a heat shield 14, and a retainer 16 as shown FIGS. 1-3. Illustratively, the attachment body 12 is arranged to couple the turbine-blade assembly 10 to a rotor for rotation about a central axis of a gas turbine engine. The heat shield 14 is arranged to form a portion of an airfoil 18 of the turbine-blade assembly 10 and interact with hot air passing through the gas turbine engine. The retainer 16 is configured to retain the heat shield 14 on the turbine-blade assembly 10.

The retainer 16 comprises metallic materials and includes a cap 20, a spar 22, and a stem 24 as shown in FIGS. 1 and 2. The cap 20 is located at a distal end 11 of the turbine-blade assembly 10 and is arranged to extend over the heat shield 14. The stem 24 is located at a proximal end 13 of the turbine-blade assembly 10 and forms part a root 28 of the turbine-blade assembly 10. The spar 22 extends between and interconnects the cap 20 and the stem 24.

The attachment body 12 includes a platform 26, the root 28, and a fastener 30, as shown in FIGS. 1 and 2. The platform 26 extends away outwardly from the spar 22 and cooperates with the cap 20 to locate the heat shield 14 therebetween. The root 28 is configured to couple the turbine-blade assembly 10 to the rotor of the gas turbine engine. The fastener 30 extends through the root 28 and the stem 24 to couple the retainer 16 to the attachment body 12.

The heat shield 14 comprises ceramic materials and is arranged around a portion of the spar 22 to help withstand high temperatures of the gasses passing over the airfoil 18. The heat shield 14 includes a body 32, a top surface 34, an outer surface 35, and a bottom surface 36 as shown in FIGS. 1-3. The body 32 extends around the spar 22 and forms a portion of the airfoil 18. The top surface 34 is located radially outward from the bottom surface 36 and is arranged to interact with the retainer 16. The bottom surface 36 is located radially inward from the top surface 34 and is arranged to interact with the platform 26 of the attachment body 12.

The heat shield 14 and the retainer 16 cooperate to form the airfoil 18 of the turbine-blade assembly 10 as shown in FIGS. 1 and 2. The airfoil 18 includes a leading edge 18L, a trailing edge 18T, a pressure side 18P, and a suction side 18S as shown in FIGS. 1 and 2. Each of the pressure side 18P and the suction side 18S extends from the leading edge 18L to the trailing edge 18T.

The attachment body 12 includes a first part 38 and a second part 40 as shown in FIGS. 1 and 2. The first part 38 and the second part 40 cooperate with the stem 24 of the retainer 16 to form the root 28. The first part 38 and the second part 40 are similar to one another and cooperate to locate a portion of the stem 24 therebetween.

Each of the first part 38 and the second part 40 include a root segment 42, 43, a platform segment 44, 45, and a fastener plate 46, 47 as shown in FIGS. 1 and 2. The root segments 42, 43 are configured to couple the turbine-blade assembly 10 to the rotor of a gas turbine engine. The platform segments 44, 45 are configured to form the platform 26 of the turbine-blade assembly 10 and define a portion of the gas path when the turbine-blade assembly 10 is in a gas turbine engine. The fastener plates 46, 47 are formed to include an aperture configured to receive a fastener, illustratively a dowel 41, to couple the first and second parts 38, 40 to the retainer 16.

Each of the platform segments 44, 45 include a top surface 48, 49 that define the gas path when the turbine-blade assembly 10 is in a gas turbine engine as shown in FIG. 2. The top surfaces 48, 49 are arranged to seat against the bottom surface 36 of the heat shield 14 as shown in FIG. 2.

The retainer 16 includes the cap 20, the spar 22, and the stem 24 as shown in FIGS. 1 and 2. The retainer 16 cooperates with the first and second parts 38, 40 to retain the heat shield 14 on the turbine-blade assembly 10.

The cap 20 includes a spar mount 50, a pressure-side segment 52, and a suction-side segment 53 as shown in FIGS. 2 and 3. In some embodiments, the cap 20 is formed to include a vent aperture 56. The spar mount 50 extends between the pressure-side segment 52 and the suction-side segment 53 and couples the cap 20 to the spar 22. Each of the pressure-side segment 52 and suction-side segment 53 extends outwardly from the spar mount 50 to overlie the heat shield 14.

The pressure-side segment 52 cooperates with the platform segment 44 to locate the heat shield 14 therebetween as shown in FIG. 2. The pressure-side segment 52 includes a bottom surface 54, a pressure-side surface 55, and a top surface 57 as shown in FIG. 2. The bottom surface 54 is arranged to seat against the top surface 34 of the heat shield 14 as shown in FIG. 3. The pressure-side surface 55 is generally coplanar with the body 32 of the heat shield 14 and forms part of the airfoil 18. In some embodiments, the top surface 57 is formed to include the vent aperture 56.

The suction-side segment 53 cooperates with the platform segment 45 to locate the heat shield 14 therebetween as shown in FIG. 2. The suction-side segment 53 includes a bottom surface 58, a suction-side surface 59, and a top surface 60 as shown in FIGS. 2 and 3. The bottom surface 58 is arranged to seat against the top surface 34 of the heat shield 14 as shown in FIG. 3. The suction-side surface 59 is arranged to be coplanar with the body 32 of the heat shield 14 and forms part of the airfoil 18. In some embodiments, the top surface 60 is formed to include the vent aperture 56.

The spar 22 extends between the cap 20 to the stem 24 as shown in FIGS. 2 and 3. The spar 22 includes a cap mount 61, a stem mount 62, and an outer surface 63 as shown in FIGS. 2 and 3. The cap mount 61 is configured to couple the cap 20 to the spar 22. The stem mount 62 is configured to couple the spar 22 to the stem 24. The outer surface 63 is arranged to face the heat shield 14.

The outer surface 63 of the spar 22 cooperates with an inner surface 64 of the heat shield 14, the bottom surfaces 54, 58 of the cap 20, and the top surfaces 48, 49 of the platform 26 to define a body cavity 65 as shown in FIGS. 2 and 3. In some embodiments, the body cavity 65 is in fluid communication with the vent aperture 56. In some embodiments, the body cavity 65 is in fluid communication with cooling air coming from the rotor of the gas turbine engine. In some embodiments, cooling air passes from the rotor through the body cavity 65 and out the vent aperture 56.

In the illustrative embodiment, the heat shield 14 is a composite adapted to withstand very high operating temperatures that may not be possible for metallic components. More specifically, the heat shield 14 comprises a ceramic matrix composite (CMC). In some embodiments, the heat shield 14 is made from a SiC—SiC ceramic matrix composite including a silicon carbide matrix and silicon carbide fibers. For purposes of this application, a ceramic-containing material is any monolithic ceramic or composite in which at least one constituent is a ceramic. Of course, other suitable CMCs or composite combinations may be used.

Figure 4:
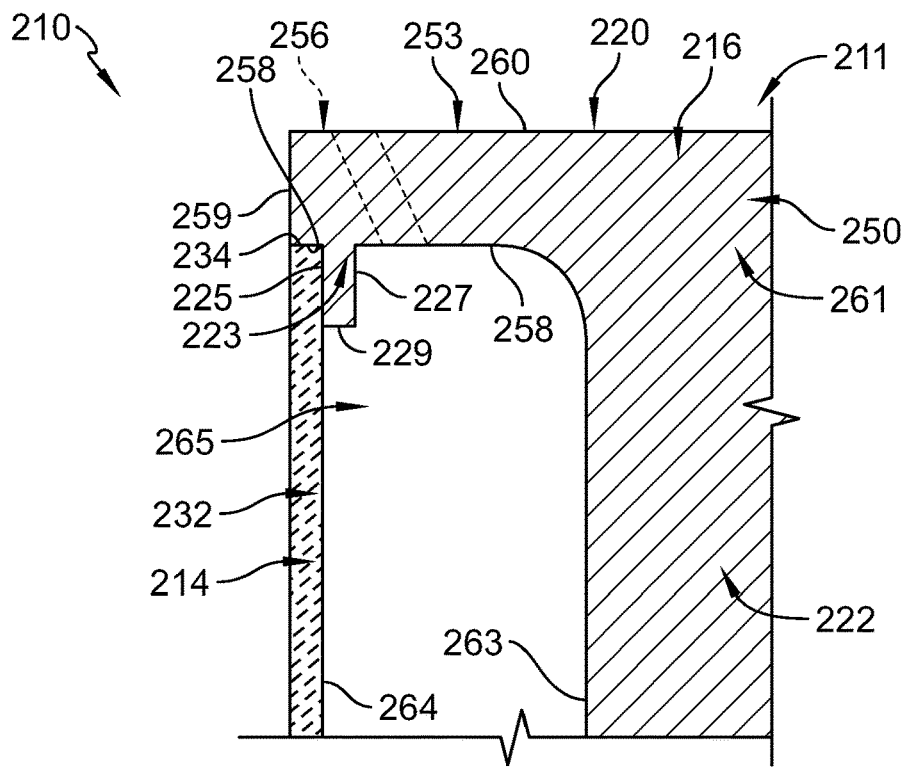
FIG. 4 is a view similar to FIG. 3 of another embodiment of a turbine-blade assembly similar to the one shown in FIG. 1, showing a heat shield seated against a load pad of a retainer.

Another illustrative turbine-blade assembly 210 adapted for use in a gas turbine engine is shown in FIG. 4. The turbine-blade assembly 210 is substantially similar to the turbine-blade assembly 10 shown in FIGS. 1-3 and described herein. Accordingly, similar reference numbers in the 200 series indicate features that are common between the turbine-blade assembly 10 and the turbine-blade assembly 210. The description of the turbine-blade assembly 10 is hereby incorporated by reference to apply to the turbine-blade assembly 210, except in instances when it conflicts with the specific description and drawings of the turbine-blade assembly 210.

The turbine-blade assembly 210 includes a heat shield 214, and a retainer 216, as shown FIG. 4. The heat shield 214 is arranged to form a portion of an airfoil of the turbine-blade assembly 210 and interact with hot air passing through the gas turbine engine. The retainer 216 is configured to retain the heat shield 214 on the turbine-blade assembly 210.

The retainer 216 comprises metallic materials and includes a cap 220, a spar 222, and a load pad 223 as shown in FIG. 4. The cap 220 is located at a distal end 211 of the turbine-blade assembly 210 and is arranged to extend over the heat shield 214. The spar 222 extends between and interconnects the cap 220 and the stem. The load pad 223 extends downwardly away from the cap 220 into a body cavity 265.

The heat shield 214 comprises ceramic materials and is arranged around a portion of the spar 222 to help withstand high temperatures of the gasses passing over the turbine-blade assembly 210. The heat shield 214 includes a body 232, a top surface 234, an outer surface 235, and an inner surface 264 as shown in FIG. 4. The body 232 extends around the spar 222 and forms a portion of the airfoil. The top surface 234 is arranged to interact with the retainer 216. The inner surface 264 is arranged to face towards the spar 222.

The cap 220 includes a spar mount 250, a suction-side segment 253, and a pressure-side segment, as shown in FIG. 4. In some embodiments, the cap 220 is formed to include a vent aperture 256. The spar mount 250 couples the cap 220 to the spar 222. The suction-side segment 253 extends outwardly from the spar mount 250 to overlie the heat shield 214.

The suction-side segment 253 cooperates with the platform to locate the heat shield 214 therebetween as suggested in FIG. 4. The suction-side segment 253 includes a bottom surface 258, a suction-side surface 259, a top surface 260, and a load pad 223 as shown in FIG. 4. The bottom surface 258 is arranged to seat against the top surface 234 of the heat shield 214 as shown in FIG. 4. The suction-side surface 259 is arranged to be generally coplanar with the body 232 of the heat shield 214 and forms part of the airfoil. In some embodiments, the top surface 260 is formed to include the vent aperture 256. The load pad 223 extends from the bottom surface 258 into a body cavity 265.

The load pad 223 includes an outer surface 225, an inner surface 227, and a bottom surface 229 as shown in FIG. 4. The outer surface 225 is configured to support the heat shield 214. The inner surface 227 faces the spar 222. The bottom surface 229 extends between and interconnects the outer surface 225 and the inner surface 227.

The spar 222 extends downwardly from the cap 220 as shown in FIG. 4. The spar 222 includes a cap mount 261 and an outer surface 263 as shown in FIG. 4. The cap mount 261 is configured to couple the cap 220 to the spar 222. The outer surface 263 is arranged to face the heat shield 214.

The outer surface 263 of the spar 222 cooperates with the inner surface 264 of the heat shield 214 and the bottom surface 258 of the cap 220 to define a portion of the body cavity 265 as shown in FIG. 4. In some embodiments, the body cavity 265 is in fluid communication with the vent aperture 256. In some embodiments, the body cavity 265 is in fluid communication with cooling air coming from the rotor of the gas turbine engine. In some embodiments, cooling air passes from the rotor through the body cavity 265 and out the vent aperture 256.

Figure 5:
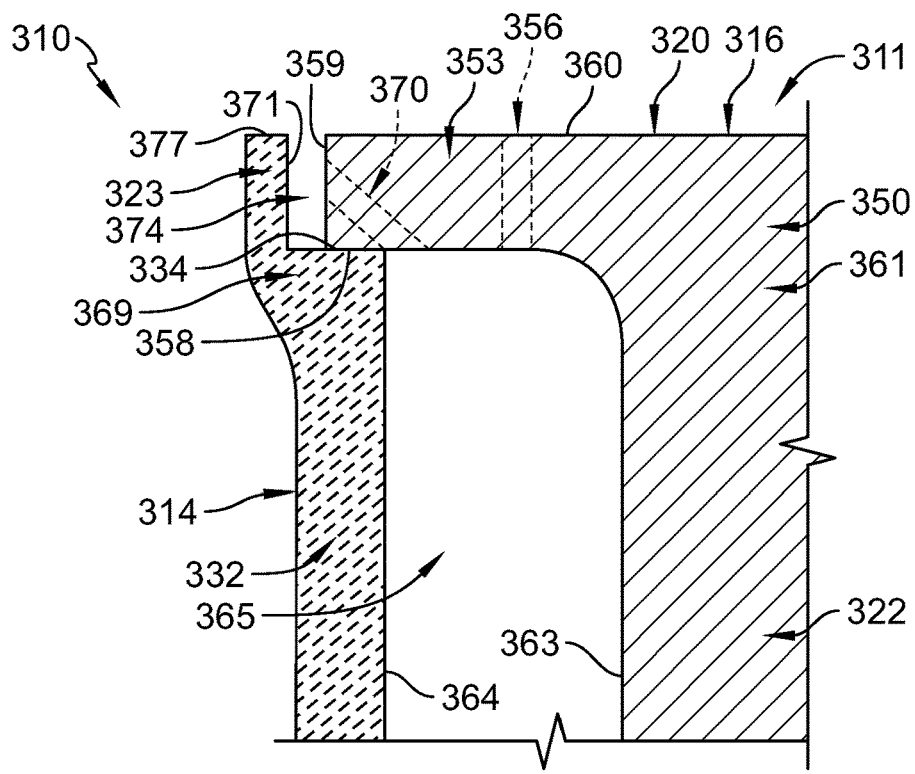
FIG. 5 is a view similar to FIG. 3 of another embodiment of a turbine-blade assembly similar to the one shown in FIG. 1, showing a rim coupled to a located spaced-apart from a retainer and coupled to the heat shield to form a vent groove.

Another illustrative turbine-blade assembly 310 adapted for use in a gas turbine engine is shown in FIG. 5. The turbine-blade assembly 310 is substantially similar to the turbine-blade assembly 10 shown in FIGS. 1-3 and described herein. Accordingly, similar reference numbers in the 300 series indicate features that are common between the turbine-blade assembly 10 and the turbine-blade assembly 310. The description of the turbine-blade assembly 10 is hereby incorporated by reference to apply to the turbine-blade assembly 310, except in instances when it conflicts with the specific description and drawings of the turbine-blade assembly 310.

The turbine-blade assembly 310 includes a heat shield 314, a retainer 316, and a rim 323 as shown FIG. 5. The heat shield 314 is arranged to form a portion of an airfoil of the turbine-blade assembly 310 and interact with hot air passing through the gas turbine engine. The retainer 316 is configured to retain the heat shield 314 on the turbine-blade assembly 310. The rim 323 is coupled to the heat shield 314 and is located spaced-apart from the retainer 316.

The retainer 316 comprises metallic materials and includes a cap 320 and a spar 322 as shown in FIG. 5. The cap 320 is located at a distal end 311 of the turbine-blade assembly 310 and is arranged to extend over a portion of the heat shield 314. The spar 322 extends between and interconnects the cap 320 and the stem.

The heat shield 314 comprises ceramic materials and is arranged around a portion of the spar 322 to help withstand high temperatures of the gasses passing over the turbine-blade assembly 310. The heat shield 314 includes a body 332, a top surface 334, an outer surface 335, and an inner surface 364 as shown in FIG. 5. The body 332 extends around the spar 322 and forms a portion of the airfoil. The top surface 334 is arranged to interact with the retainer 316. The inner surface 364 is arranged to face towards the spar 322.

The cap 320 includes a spar mount 350, a suction-side segment 353, and a pressure-side segment, as shown in FIG. 5. In some embodiments, the cap 320 is formed to include a vent aperture 356. In some embodiments, the cap 320 is formed to include a groove aperture 370. The spar mount 350 couples the cap 320 to the spar 322. The suction-side segment 353 extends outwardly from the spar mount 350 to overlie a portion of the heat shield 314.

The suction-side segment 353 cooperates with the platform to locate a portion of the heat shield 314 therebetween as suggested in FIG. 5. The suction-side segment 353 includes a bottom surface 358, a suction-side surface 359, and a top surface 360 as shown in FIG. 5. The bottom surface 358 is arranged to seat against the top surface 334 of the heat shield 314 as shown in FIG. 5. The suction-side surface 359 is arranged to face an inner surface 371 of the rim 323. In some embodiments, the top surface 360 is formed to include the vent aperture 356. In some embodiments, the suction-side surface 359 is formed to include the groove aperture 370.

The spar 322 extends downwardly from the cap 320 as shown in FIG. 5. The spar 322 includes a cap mount 361 and an outer surface 363 as shown in FIG. 5. The cap mount 361 is configured to couple the cap 320 to the spar 322. The outer surface 363 is arranged to face the heat shield 314.

The outer surface 363 of the spar 322 cooperates with the inner surface 364 of the heat shield 314 and the bottom surface 358 of the cap 320 to define a portion of the body cavity 365 as shown in FIG. 5. In some embodiments, the body cavity 365 is in fluid communication with the vent aperture 356. In some embodiments, the body cavity 365 is in fluid communication with the groove aperture 370. In some embodiments, the body cavity 365 is in fluid communication with cooling air coming from the rotor of the gas turbine engine. In some embodiments, cooling air passes from the rotor through the body cavity 365 and out the vent aperture 356, the groove aperture 370, or a combination thereof.

The rim 323 comprises ceramic materials and is coupled to the heat shield 314 as shown in FIG. 5. The rim 323 includes a heat shield mount 369, the inner surface 371, and an outer surface 378. The heat shield mount 369 is configured to couple the rim 323 to the body 332 of the heat shield 314. The inner surface 371 is arranged to face the suction-side surface 359 of the cap 320. Illustratively, a top surface 377 of the rim 323 is generally coplanar with the top surface 360 of the cap 320. In some embodiments, the top surface 377 extends above the top surface 360 of the cap 320. The inner surface 371 cooperates with the top surface 334 of the heat shield 314 and the suction-side surface 359 to define a vent groove 374. In some embodiments, the vent groove 374 is in fluid communication with the body cavity 365. The outer surface 378 is located outward axially from the outer surface 335 of the heat shield 314.

Figure 6:
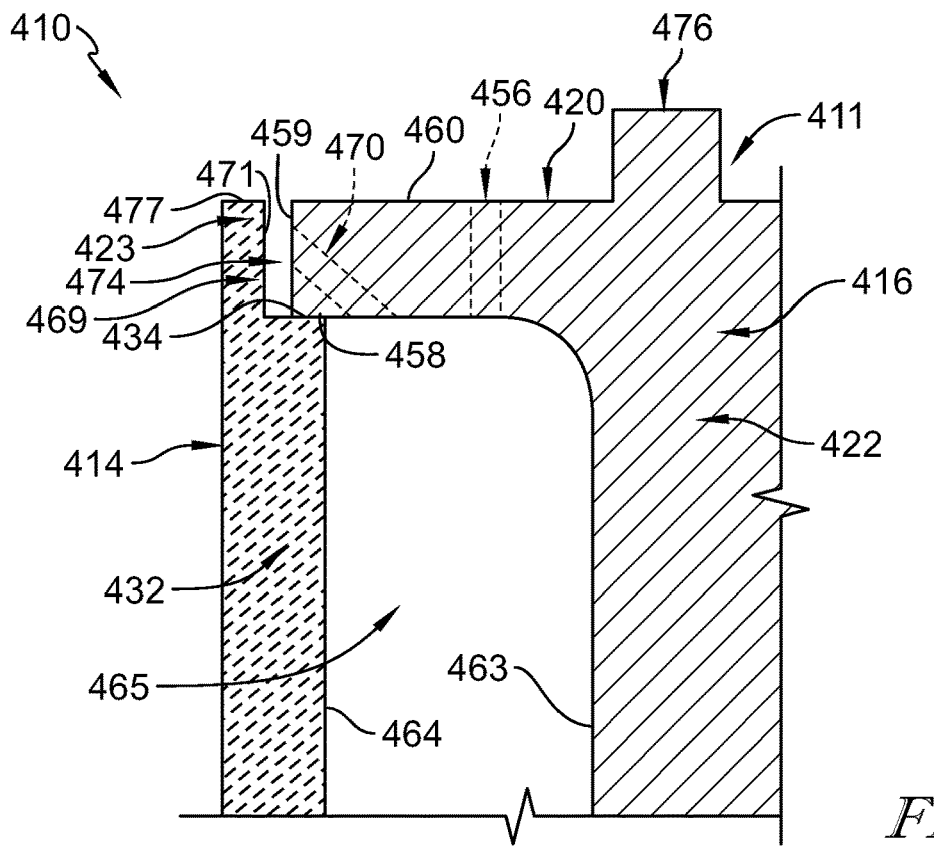
FIG. 6 is a view similar to FIG. 3 of another embodiment of a turbine-blade assembly similar to the one shown in FIG. 1, showing a rim coupled to a heat shield and further showing the retainer includes a ridge extending from a top surface of the retainer.

Another illustrative turbine-blade assembly 410 adapted for use in a gas turbine engine is shown in FIG. 6. The turbine-blade assembly 410 is substantially similar to the turbine-blade assemblies 10, shown in FIGS. 1-3 and described herein. Accordingly, similar reference numbers in the 400 series indicate features that are common between the turbine-blade assembly 10 and the turbine-blade assembly 410. The description of the turbine-blade assembly 10 is hereby incorporated by reference to apply to the turbine-blade assembly 410, except in instances when it conflicts with the specific description and drawings of the turbine-blade assembly 410.

The turbine-blade assembly 410 includes a heat shield 414, a retainer 416, and a rim 423 as shown FIG. 6. The heat shield 414 is arranged to form a portion of an airfoil of the turbine-blade assembly 410 and interact with hot air passing through the gas turbine engine. The retainer 416 is configured to retain the heat shield 414 on the turbine-blade assembly 410. The rim 423 is coupled to the heat shield 414 and is located spaced-apart from the retainer 416.

The retainer 416 comprises metallic materials and includes a cap 420 and a spar 422 as shown in FIG. 6. The cap 420 is located at a distal end 411 of the turbine-blade assembly 410 and is arranged to extend over a portion of the heat shield 414. The spar 422 extends between and interconnects the cap 420 and the stem.

The heat shield 414 comprises ceramic materials and is arranged around a portion of the spar 422 to help withstand high temperatures of the gasses passing over the turbine-blade assembly 410. The heat shield 414 includes a body 432, a top surface 434, an outer surface 435, and an inner surface 464 as shown in FIG. 6. The body 432 extends around the spar 422 and forms a portion of the airfoil. The top surface 434 is arranged to interact with the retainer 416. The inner surface 464 is arranged to face towards the spar 422.

The cap 420 includes a spar mount 450, a suction-side segment 453, and a ridge 476 as shown in FIG. 6. In some embodiments, the cap 420 is formed to include a vent aperture 456. In some embodiments, the cap 420 is formed to include a groove aperture 470. The spar mount 450 couples the cap 420 to the spar 422. The suction-side segment 453 extends outwardly from the spar mount 450 to overlie a portion of the heat shield 414. The ridge 476 extends upwardly away from the cap 420 and is configured to provide a squealer tip that rubs a blade track surrounding the assembly. During a rub, only a small portion of the ridge 476 is actually rubbing against the blade track, reducing rub loads and enabling tighter clearances. It also helps to have a contraction, expansion, contraction, expansion as air leaks over the blade tip. This can reduce the amount of overtip leakage.

The suction-side segment 453 cooperates with the platform to locate a portion of the heat shield 414 therebetween as suggested in FIG. 6. The suction-side segment 453 includes a bottom surface 458, a suction-side surface 459, and a top surface 460 as shown in FIG. 6. The bottom surface 458 is arranged to seat against the top surface 434 of the heat shield 414 as shown in FIG. 6. The suction-side surface 459 is arranged to face an inner surface 471 of the rim 423. In some embodiments, the top surface 460 is formed to include the vent aperture 456. In some embodiments, the suction-side surface 459 is formed to include the groove aperture 470.

The spar 422 extends downwardly from the cap 420 as shown in FIG. 6. The spar 422 includes a cap mount 461 and an outer surface 463 as shown in FIG. 6. The cap mount 461 is configured to couple the cap 420 to the spar 422. The outer surface 463 is arranged to face the heat shield 414.

The outer surface 463 of the spar 422 cooperates with the inner surface 464 of the heat shield 414 and the bottom surface 458 of the cap 420 to define a portion of the body cavity 465 as shown in FIG. 6. In some embodiments, the body cavity 465 is in fluid communication with the vent aperture 456. In some embodiments, the body cavity 465 is in fluid communication with the groove aperture 470. In some embodiments, the body cavity 465 is in fluid communication with cooling air coming from the rotor of the gas turbine engine. In some embodiments, cooling air passes from the rotor through the body cavity 465 and out the vent aperture 456, the groove aperture 470, or a combination thereof.

The rim 423 comprises ceramic materials and is coupled to the heat shield 414 as shown in FIG. 6. The rim 423 includes a heat shield mount 469, an outer surface 478, and an inner surface 471. The heat shield mount 469 is configured to couple the rim 423 to the body 432 of the heat shield 414. The inner surface 471 is arranged to face the suction-side surface 459 of the cap 420. Illustratively, a top surface 477 of the rim 423 is generally coplanar with the top surface 460 of the cap 420. Illustratively, the heat shield mount 469 is arranged so that the outer surface 478 is generally coplanar with an outer surface 435 the heat shield 414. In some embodiments, the top surface 477 extends above the top surface 460 of the cap 420. The inner surface 471 cooperates with the top surface 434 of the heat shield 414 and the suction-side surface 459 to define a vent groove 474. In some embodiments, the vent groove 474 is in fluid communication with the body cavity 465 and the groove aperture 470.

Figure 7:
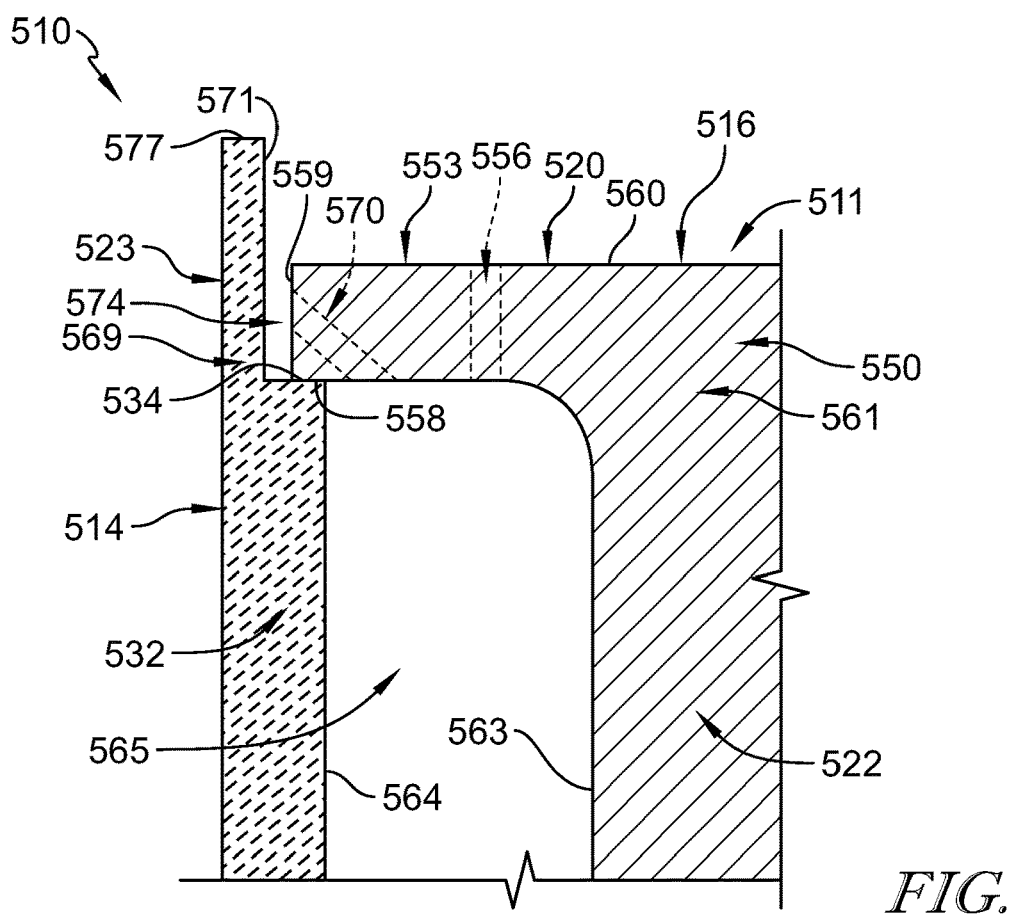
FIG. 7 is a view similar to FIG. 3 of another embodiment of a turbine-blade assembly similar to the one shown in FIG. 1, showing a rim located spaced-apart from a retainer and coupled to a heat shield to form a vent groove, and further showing a top surface of the rim extending above a top surface of the retainer.

Another illustrative turbine-blade assembly 510 adapted for use in a gas turbine engine is shown in FIG. 7. The turbine-blade assembly 510 is substantially similar to the turbine-blade assembly 10 shown in FIGS. 1-3 and described herein. Accordingly, similar reference numbers in the 500 series indicate features that are common between the turbine-blade assembly 10 and the turbine-blade assembly 510. The description of the turbine-blade assembly 10 is hereby incorporated by reference to apply to the turbine-blade assembly 510, except in instances when it conflicts with the specific description and drawings of the turbine-blade assembly 510.

The turbine-blade assembly 510 includes a heat shield 514, a retainer 516, and a rim 523 as shown FIG. 7. The heat shield 514 is arranged to form a portion of an airfoil 518 of the turbine-blade assembly 510 and interact with hot air passing through the gas turbine engine. The retainer 516 is configured to retain the heat shield 514 on the turbine-blade assembly 510. The rim 523 is coupled to the heat shield 514 and is located spaced-apart from the retainer 516.

The retainer 516 comprises metallic materials and includes a cap 520 and a spar 522 as shown in FIG. 7. The cap 520 is located at a distal end 511 of the turbine-blade assembly 510 and is arranged to extend over a portion of the heat shield 514. The spar 522 extends between and interconnects the cap 520 and the stem.

The heat shield 514 comprises ceramic materials and is arranged around a portion of the spar 522 to help withstand high temperatures of the gasses passing over the turbine-blade assembly 510. The heat shield 514 includes a body 532, a top surface 534, an outer surface 535, and an inner surface 564 as shown in FIG. 7. The body 532 extends around the spar 522 and forms a portion of the airfoil. The top surface 534 is arranged to interact with the retainer 516. The inner surface 564 is arranged to face towards the spar 522.

The cap 520 includes a spar mount 550, a suction-side segment 553, and a pressure-side segment, as shown in FIG. 7. In some embodiments, the cap 520 is formed to include a vent aperture 556. In some embodiments, the cap 520 is formed to include a groove aperture 570. The spar mount 550 couples the cap 520 to the spar 522. The suction-side segment 553 extends outwardly from the spar mount 450 to overlie a portion of the heat shield 514.

The suction-side segment 553 cooperates with the platform to locate a portion of the heat shield 514 therebetween as suggested in FIG. 7. The suction-side segment 553 includes a bottom surface 558, a suction-side surface 559, and a top surface 560 as shown in FIG. 7. The bottom surface 558 is arranged to seat against the top surface 534 of the heat shield 514 as shown in FIG. 7. The suction-side surface 559 is arranged to face an inner surface 571 of the rim 523. In some embodiments, the top surface 560 is formed to include the vent aperture 556. In some embodiments, the suction-side surface 559 is formed to include the groove aperture 570.

The spar 522 extends downwardly from the cap 520 as shown in FIG. 7. The spar 522 includes a cap mount 561 and an outer surface 563 as shown in FIG. 7. The cap mount 561 is configured to couple the cap 520 to the spar 522. The outer surface 563 is arranged to face the heat shield 514.

The outer surface 563 of the spar 522 cooperates with the inner surface 564 of the heat shield 514 and the bottom surface 558 of the cap 520 to define a portion of the body cavity 565 as shown in FIG. 7. In some embodiments, the body cavity 565 is in fluid communication with the vent aperture 556. In some embodiments, the body cavity 565 is in fluid communication with the groove aperture 570. In some embodiments, the body cavity 565 is in fluid communication with cooling air coming from the rotor of the gas turbine engine. In some embodiments, cooling air passes from the rotor through the body cavity 565 and out the vent aperture 556, the groove aperture 570, or a combination thereof.

The rim 523 comprises ceramic materials and is coupled to the heat shield 514 as shown in FIG. 7. The rim 523 includes a heat shield mount 569, the inner surface 571, and an outer surface 578. The heat shield mount 1069 is configured to couple the rim 523 to the body 532 of the heat shield 514. In some embodiments, the heat shield mount 569 extends outwardly from the body 532 of the heat shield 514. The inner surface 571 is arranged to face the suction-side surface 559 of the cap 520. Illustratively, the rim 523 extends above the cap 520 so that a top surface 577 of the rim 523 is located radially outward from the top surface 560 of the cap 520. Illustratively, the heat shield mount 569 is arranged so that the outer surface 578 is generally coplanar with the outer surface 535 of the heat shield 514. The inner surface 571 of the rim 523 cooperates with the top surface 534 of the heat shield 514 and the suction-side surface 559 to define a vent groove 574. In some embodiments, the vent groove 574 is in fluid communication with the body cavity 565. The outer surface 578 is generally co-planar with the outer surface 535 of the heat shield 514.

The rim 523 also provides a squealer tip that rubs a turbine shroud or seal ring arranged around the assembly 510 as shown in FIG. 7. During a rub, only a small portion of the rim 523 is actually rubbing against the blade track, reducing rub loads and enabling tighter clearances. It also helps to have a contraction, expansion, contraction, expansion as air leaks over the blade tip. This can reduce the amount of overtip leakage.

Figure 8:
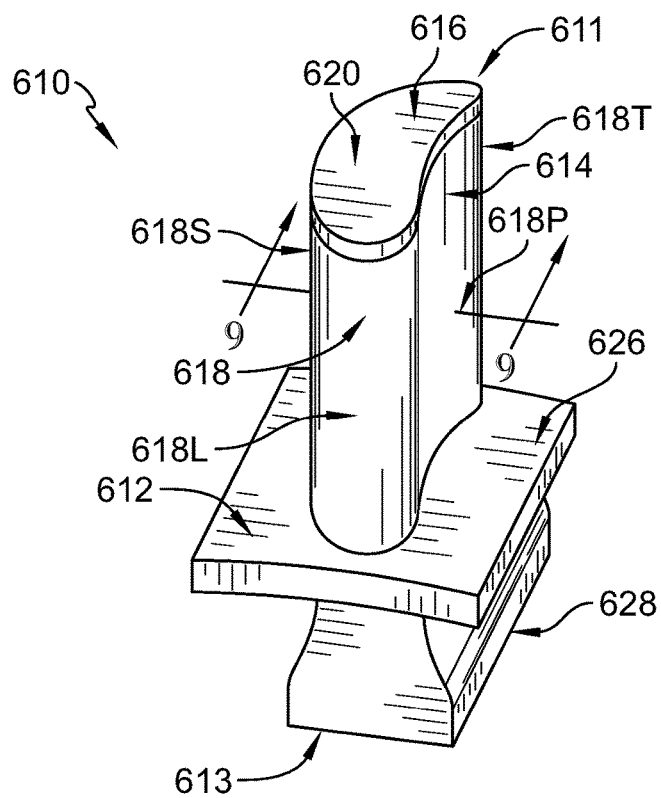
FIG. 8 is a perspective view of another embodiment of a turbine-blade assembly in accordance with the present disclosure, showing that the turbine-blade assembly includes an attachment body forming a platform and a root, a heat shield, and a retainer coupled to the attachment body to locate the heat shield between the retainer and the platform of the attachment body.
Figure 9:
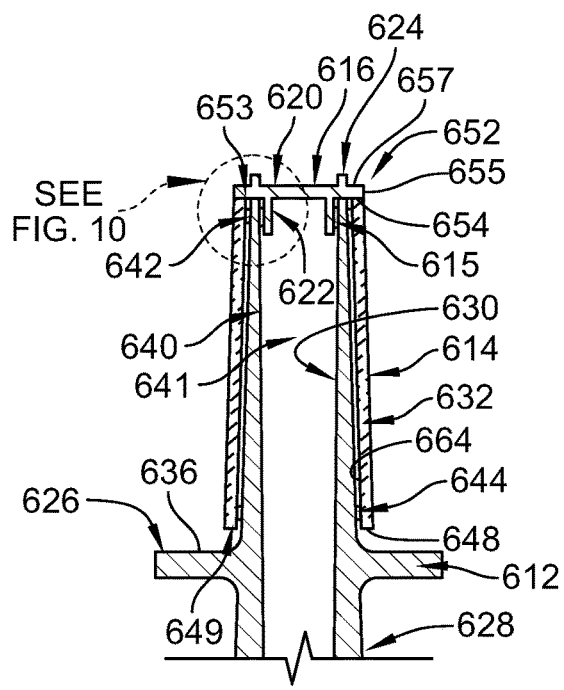
FIG. 9 is a sectional view taken along line 9-9 of FIG. 8, showing the attachment body forms the platform and a spar, and further showing the retainer is coupled to the spar at a distal end of the turbine-blade assembly.
Figure 10:
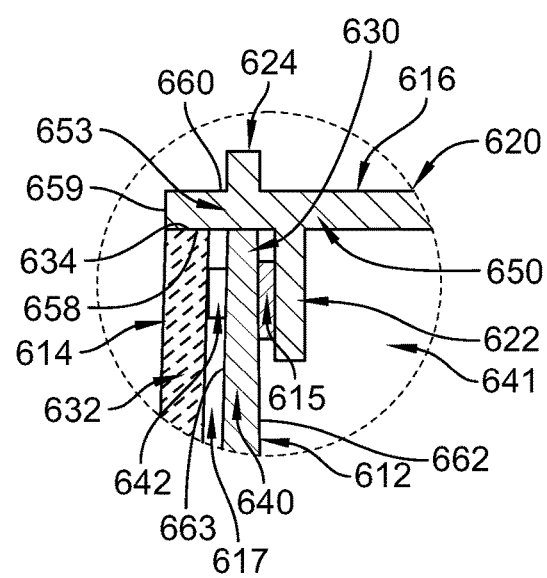
FIG. 10 is a detailed view of a portion of FIG. 9, showing the retainer includes an coupler flange coupled to an inner surface of the spar, and further showing the heat shield seated against a load pad of the spar.

An illustrative turbine-blade assembly 610 is shown in FIGS. 8-10. The turbine-blade assembly 610 includes an attachment body 612, a heat shield 614, and a retainer 616 as shown FIGS. 8-10. Illustratively, the attachment body 612 is arranged to couple the turbine-blade assembly 610 to a rotor for rotation about a central axis of a gas turbine engine. The heat shield 614 is arranged to form a portion of an airfoil 618 of the turbine-blade assembly 610 and interact with hot air passing through the gas turbine engine. The retainer 616 is configured to retain the heat shield 614 on the turbine-blade assembly 610.

The retainer 616 comprises metallic materials and includes a cap 620, a coupler flange 622, and a ridge 624 as shown in FIGS. 9 and 10. The cap 620 is located at a distal end 611 of the turbine-blade assembly 610 and is arranged to extend over the heat shield 614. The coupler flange 622 extends proximally into a hollow cavity 641 and is configured to couple the cap 620 to the attachment body 612 at the distal end 611 of the turbine-blade assembly 610. The ridge 624 extends away upwardly from the cap 620 and is configured to interact with air passing through the gas path.

The attachment body 612 includes a platform 626, the root 628, and a spar 630, as shown in FIGS. 9 and 10. The platform 626 extends away outwardly from the spar 630 and cooperates with the cap 620 to locate the heat shield 614 therebetween. The root 628 is configured to couple the turbine-blade assembly 610 to the rotor of the gas turbine engine. The spar 630 extends through the heat shield 614 to couple the retainer 616 to the attachment body 612 with a bond 615. In some embodiments, the bond 615 is a braze. In some embodiments, the bond 615 is a weld. Of course, any suitable bonding technique may be used to couple the spar 630 with the retainer 616.

The heat shield 614 comprises ceramic materials and is arranged around a portion of the spar 630 to help withstand high temperatures of the gasses passing over the airfoil 618. The heat shield 614 includes a body 632, a top surface 634, an outer surface 635, and a bottom surface 648, as shown in FIGS. 8-10. The body 632 extends around the spar 630 and forms a portion of the airfoil 618. The top surface 634 is located radially outward from the bottom surface 648 and is arranged to interact with the retainer 616. The bottom surface 648 is located radially inward from the top surface 634 and is arranged to interact with the platform 626 of the attachment body 612.

The heat shield 614 and the retainer 616 cooperate to form the airfoil 618 of the turbine-blade assembly 610 as shown in FIGS. 8 and 9. The airfoil 618 includes a leading edge 618L, a trailing edge 618T, a pressure side 618P, and a suction side 618S as shown in FIGS. 8 and 9. Each of the pressure side 618P and the suction side 618S extends from the leading edge 618L to the trailing edge 618T.

The platform 626 includes a top surface 636 that define the gas path when the turbine-blade assembly 610 is in a gas turbine engine, as shown in FIG. 9. The top surface 636 is located spaced-apart from the bottom surface 648 of the heat shield 614 to form an outlet 649 as shown in FIG. 9.

The spar 630 includes a body 640, a distal load pad 642, and a proximal load pad 644, as shown in FIGS. 9 and 10.

The body 640 extends through the heat shield 614 and is configured to form the hollow cavity 641. The distal load pad 642 is located between the proximal load pad 644 and the retainer 616. The proximal load pad 644 is located between the distal load pad 642 and the platform 626. The load pads 642, 644 cooperate with the heat shield 614 to define a cooling gap 617 therebetween.

The cap 620 includes a flange mount 650, a pressure-side segment 652, and a suction-side segment 653 as shown in FIGS. 9 and 10. In some embodiments, the cap 620 is formed to include a vent aperture. The flange mount 650 couples the cap 620 to coupler flange 622. Each of the pressure-side segment 652 and the suction-side segment 653 extends outwardly from the coupler flange 622 to overlie the heat shield 614.

The pressure-side segment 652 cooperates with the platform 626 to locate the heat shield 614 therebetween as shown in FIG. 9. The pressure-side segment 652 includes a bottom surface 654, a pressure-side surface 655, and a top surface 657 as shown in FIG. 9. The bottom surface 654 is arranged to seat against the top surface 634 of the heat shield 614 as shown in FIG. 9. The pressure-side surface 655 is generally coplanar with the body 632 of the heat shield 614 and forms part of the airfoil 618. In some embodiments, the top surface 657 is formed to include a vent aperture.

The suction-side segment 653 cooperates with the platform 626 to locate the heat shield 614 therebetween as shown in FIG. 9. The suction-side segment 653 includes a bottom surface 658, a suction-side surface 659, and a top surface 660 as shown in FIGS. 9 and 10. The bottom surface 658 is arranged to seat against the top surface 634 of the heat shield 614 as shown in FIG. 10. The suction-side surface 659 is generally coplanar with the body 632 of the heat shield 614 and forms part of the airfoil 618. In some embodiments, the top surface 660 is formed to include a vent aperture.

The spar 630 extends downwardly from the cap 620 to the platform 626 as shown in FIGS. 9 and 10. The spar 630 includes a cap mount 661, an inner surface 662, and an outer surface 663 as shown in FIGS. 9 and 10. The cap mount 661 is configured to couple the cap 620 to the spar 630. The inner surface 662 defines a portion of the hollow cavity 641. The bond 615 extends between the coupler flange 622 and the inner surface 662. The outer surface 663 is arranged to face the heat shield 614.

The outer surface 663 of the spar 630 cooperates with an inner surface 664 of the heat shield 614, the bottom surfaces 654, 658 of the cap 620, to define a portion of the cooling gap 617, as shown in FIGS. 9 and 10. In some embodiments, the hollow cavity 641 is in fluid communication with the cooling gap 617. In some embodiments, the hollow cavity 641 is in fluid communication with cooling air coming from the rotor of the gas turbine engine. In some embodiments, cooling air passes from the rotor through the hollow cavity 641 and out the outlet 649.

Figure 11:
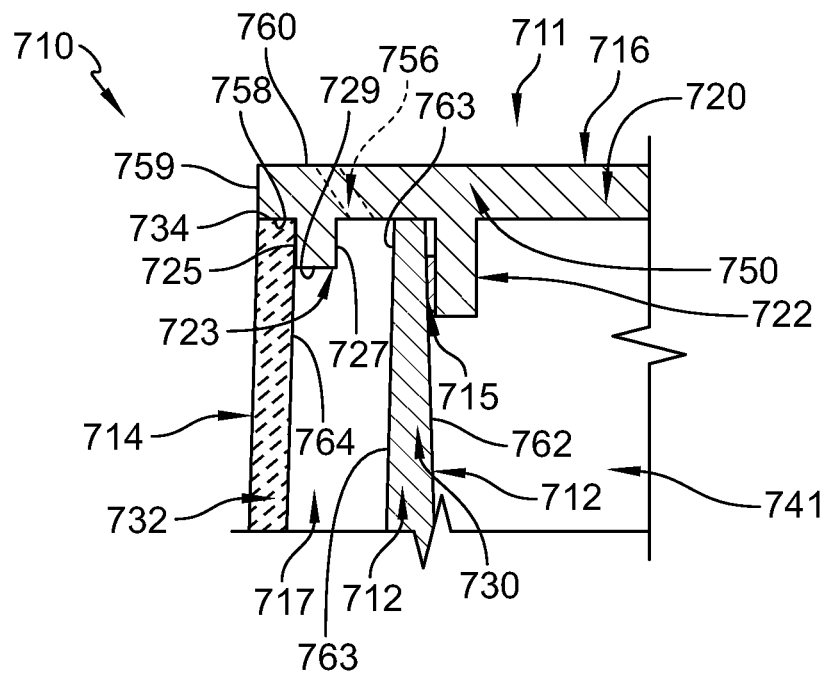
FIG. 11 is a sectional view similar to FIG. 10 of another embodiment of an airfoil in accordance with the present disclosure, showing a heat shield seated against a load pad of a retainer.

Another illustrative turbine-blade assembly 710 adapted for use in a gas turbine engine is shown in FIG. 11. The turbine-blade assembly 710 is substantially similar to the turbine-blade assembly 610 shown in FIGS. 8-10 and described herein. Accordingly, similar reference numbers in the 700 series indicate features that are common between the turbine-blade assembly 610 and the turbine-blade assembly 710. The description of the turbine-blade assembly 610 is hereby incorporated by reference to apply to the turbine-blade assembly 710, except in instances when it conflicts with the specific description and drawings of the turbine-blade assembly 710.

The turbine-blade assembly 710 includes an attachment body 712, a heat shield 714, and a retainer 716, as shown FIG. 11. The attachment body 712 includes a spar 730 that extends through heat shield 714 and is configured to couple the turbine-blade assembly 710 to a gas turbine engine. The heat shield 714 is arranged to form a portion of an airfoil of the turbine-blade assembly 710 and interact with hot air passing through the gas turbine engine. The retainer 716 is configured to retain the heat shield 714 on the turbine-blade assembly 710.

The spar 730 extends through the heat shield 714 to couple the retainer 716 to the attachment body 712 with a bond 715 as shown in FIG. 11. In some embodiments, the bond 715 is a braze. In some embodiments, the bond 715 is a weld. Of course, any suitable bonding technique may be used to couple the spar 730 with the retainer 716.

The retainer 716 comprises metallic materials and includes a cap 720, a coupler flange 722, and a load pad 723, as shown in FIG. 11. The cap 720 is located at a distal end 711 of the turbine-blade assembly 710 and is arranged to extend over a portion of the heat shield 714. The coupler flange 722 extends proximally into a hollow cavity 741 is configured to couple the cap 720 to an inner surface 762 of the spar 730 at the distal end 711 of the turbine-blade assembly 710. The load pad 723 extends downwardly away from the cap 720 into a cooling gap 717.

The heat shield 714 comprises ceramic materials and is arranged around a portion of the spar 730 to help withstand high temperatures of the gasses passing over the turbine-blade assembly 710. The heat shield 714 includes a body 732, a top surface 734, an outer surface 735, and an inner surface 764 as shown in FIG. 11. The body 732 extends around the spar 730 and forms a portion of the airfoil. The top surface 734 is arranged to interact with the retainer 716. The inner surface 764 is arranged to face towards the spar 730.

The cap 720 includes a flange mount 750, a pressure-side segment, and a suction-side segment 753 as shown in FIG. 11. In some embodiments, the cap 720 is formed to include a vent aperture 756. The flange mount 750 couples the cap 720 to coupler flange 722. Each of the pressure-side segment and the suction-side segment 753 extends outwardly from the coupler flange 722 to overlie a portion of the heat shield 714.

The suction-side segment 753 cooperates with the platform to locate the heat shield 714 therebetween as suggested in FIG. 11. The suction-side segment 753 includes a bottom surface 758, a suction-side surface 759, a top surface 760, and the load pad 723 as shown in FIG. 11. The bottom surface 758 is arranged to seat against the top surface 734 of the heat shield 714 as shown in FIG. 11. The suction-side surface 759 is arranged to be coplanar with the body 732 of the heat shield 714 and forms part of the airfoil. In some embodiments, the top surface 760 is formed to include the vent aperture 756. The load pad 723 extends from the bottom surface 758 into the cooling gap 717.

The load pad 723 includes an outer surface 725, an inner surface 727, and a bottom surface 729. The outer surface 725 is configured to support the heat shield 714. The inner surface 727 faces the spar 730. The bottom surface 729 extends between and interconnects the outer surface 725 and the inner surface 727.

An outer surface 763 of the spar 730 cooperates with the inner surface 764 of the heat shield 714 and the bottom surface 758 of the cap 720 to define a portion of the cooling gap 717 as shown in FIG. 11. In some embodiments, the cooling gap 717 is in fluid communication with the vent aperture 756. In some embodiments, the cooling gap 717 is in fluid communication with cooling air coming from the rotor of the gas turbine engine. In some embodiments, cooling air passes from the rotor through the cooling gap 717 and out the vent aperture 756.

Figure 12:
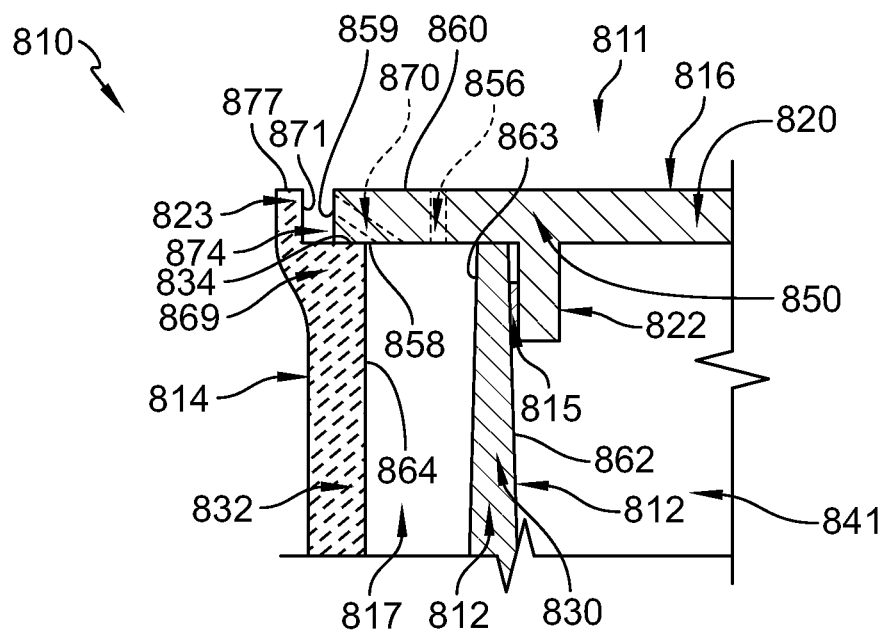
FIG. 12 is a sectional view similar to FIG. 10 of another embodiment of an airfoil in accordance with the present disclosure, showing a rim located spaced-apart from a retainer and coupled to a heat shield to form a vent groove and a top surface of the rim is coplanar with a top surface of the retainer.

Another illustrative turbine-blade assembly 810 adapted for use in a gas turbine engine is shown in FIG. 12. The turbine-blade assembly 810 is substantially similar to the turbine-blade assembly 610 shown in FIGS. 8-10 and described herein. Accordingly, similar reference numbers in the 800 series indicate features that are common between the turbine-blade assembly 610 and the turbine-blade assembly 810. The description of the turbine-blade assembly 610 is hereby incorporated by reference to apply to the turbine-blade assembly 810, except in instances when it conflicts with the specific description and drawings of the turbine-blade assembly 810.

The turbine-blade assembly 810 includes an attachment body 812, a heat shield 814, a retainer 816, and a rim 823, as shown FIG. 12. The attachment body 812 is configured to couple the turbine-blade assembly 810 to a gas turbine engine and includes a spar 830 that extends through heat shield 814. The heat shield 814 is arranged to form a portion of an airfoil of the turbine-blade assembly 810 and interact with hot air passing through the gas turbine engine. The retainer 816 is configured to retain the heat shield 814 on the turbine-blade assembly 810. The rim 823 is coupled to the heat shield 814 and is located spaced-apart from the retainer 816.

The spar 830 extends through the heat shield 814 to couple the retainer 816 to the attachment body 812 with a bond 815 as shown in FIG. 12. In some embodiments, the bond 815 is a braze. In some embodiments, the bond 815 is a weld. Of course, any suitable bonding technique may be used to couple the spar 830 with the retainer 816.

The retainer 816 comprises metallic materials and includes a cap 820 and a coupler flange 822 as shown in FIG. 12. The cap 820 is located at a distal end 811 of the turbine-blade assembly 810 and is arranged to extend over a portion of the heat shield 814. The coupler flange 822 extends proximally into a hollow cavity 841 is configured to couple the cap 820 to an inner surface 862 of the spar 830 of the attachment body 812 at the distal end 811 of the turbine-blade assembly 810.

The heat shield 814 comprises ceramic materials and is arranged around a portion of the spar 830 to help withstand high temperatures of the gasses passing over the turbine-blade assembly 810. The heat shield 814 includes a body 832, a top surface 834, an outer surface 835, and an inner surface 864, as shown in FIG. 12. The body 832 extends around the spar 830 and forms a portion of the airfoil. The top surface 834 is arranged to interact with the retainer 816. The inner surface 864 is arranged to face towards the spar 830.

The cap 820 includes a flange mount 850, a pressure-side segment, and a suction-side segment 853 as shown in FIG. 12. In some embodiments, the cap 820 is formed to include a vent aperture 856. The flange mount 850 couples the cap 820 to coupler flange 822. Each of the pressure-side segment and the suction-side segment 853 extends outwardly from the coupler flange 822 to overlie a portion of the heat shield 814.

The suction-side segment 853 cooperates with the platform to locate a portion of the heat shield 814 therebetween as suggested in FIG. 12. The suction-side segment 853 includes a bottom surface 858, a suction-side surface 859, and a top surface 860 as shown in FIG. 12. The bottom surface 858 is arranged to seat against the top surface 834 of the heat shield 814. The suction-side surface 859 is arranged to face an inner surface 871 of the rim 823. In some embodiments, the top surface 860 is formed to include the vent aperture 856. In some embodiments, the suction-side surface 859 is formed to include a groove aperture 870.

An outer surface 863 of the spar 830 cooperates with the inner surface 864 of the heat shield 814 and the bottom surface 858 of the cap 820 to define a portion of the cooling gap 817 as shown in FIG. 12. In some embodiments, the cooling gap 817 is in fluid communication with the vent aperture 856. In some embodiments, the cooling gap 817 is in fluid communication with the groove aperture 870. In some embodiments, the cooling gap 817 is in fluid communication with cooling air coming from the rotor of the gas turbine engine. In some embodiments, cooling air passes from the rotor through the cooling gap 817 and out the vent aperture 856, the groove aperture 870, or a combination thereof.

The rim 823 comprises ceramic materials and is coupled to the heat shield 814 as shown in FIG. 12. The rim 823 includes a heat shield mount 869, the inner surface 871, and an outer surface 878. The heat shield mount 869 is configured to couple the rim 823 to the body 832 of the heat shield 814. In some embodiments, the heat shield mount 869 extends outwardly from the body 832 of the heat shield 814. The inner surface 871 is arranged to face the suction-side surface 859 of the cap 820. Illustratively, a top surface 877 of the rim 823 is generally coplanar with the top surface 860 of the cap 820. In some embodiments, the top surface 877 extends above the top surface 860 of the cap 820. The inner surface 871 cooperates with the top surface 834 of the heat shield 814 and the suction-side surface 859 to define a vent groove 874. In some embodiments, the vent groove 874 is in fluid communication with the body cavity 865. The outer surface 878 is located outward axially from the outer surface 835 of the heat shield 814.

Figure 13:
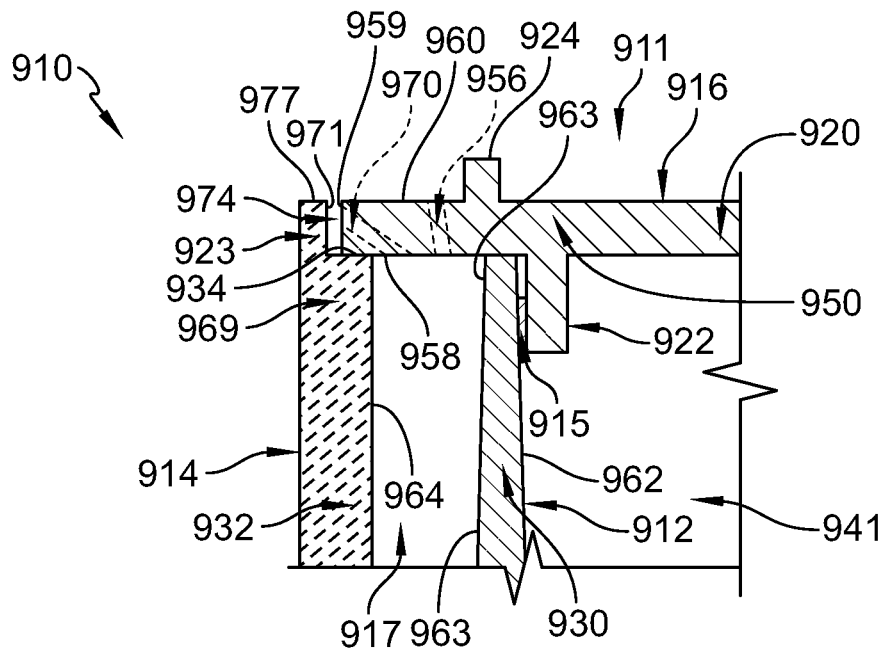
FIG. 13 is a sectional view similar to FIG. 10 of another embodiment of an airfoil in accordance with the present disclosure, showing a retainer includes a ridge extending from a top surface of the retainer.

Another illustrative turbine-blade assembly 910 adapted for use in a gas turbine engine is shown in FIG. 13. The turbine-blade assembly 910 is substantially similar to the turbine-blade assembly 610 shown in FIGS. 8-10 and described herein. Accordingly, similar reference numbers in the 900 series indicate features that are common between the turbine-blade assembly 610 and the turbine-blade assembly 910. The description of the turbine-blade assembly 610 is hereby incorporated by reference to apply to the turbine-blade assembly 910, except in instances when it conflicts with the specific description and drawings of the turbine-blade assembly 910.

The turbine-blade assembly 910 includes an attachment body 912, a heat shield 914, a retainer 916, and a rim 923 as shown FIG. 13. The attachment body 912 includes a spar 930 extends through heat shield 914 and is configured to couple the turbine-blade assembly 910 to a gas turbine engine. The heat shield 914 is arranged to form a portion of an airfoil of the turbine-blade assembly 910 and interact with hot air passing through the gas turbine engine. The retainer 916 is configured to retain the heat shield 914 on the turbine-blade assembly 910.

The spar 930 extends through the heat shield 914 to couple the retainer 916 to the attachment body 912 with a bond 915 as shown in FIG. 13. In some embodiments, the bond 915 is a braze. In some embodiments, the bond 915 is a weld. Of course, any suitable bonding technique may be used to couple the spar 930 with the retainer 916.

The retainer 916 comprises metallic materials and includes a cap 920 and a coupler flange 922 as shown in FIG.

13. The cap 920 is located at a distal end 911 of the turbine-blade assembly 910 and is arranged to extend over a portion of the heat shield 914. The coupler flange 922 extends proximally into a hollow cavity 941 and is configured to couple the cap 920 an inner surface 962 of the spar at the distal end 911 of the turbine-blade assembly 910.

The heat shield 914 comprises ceramic materials and is arranged around a portion of the spar 930 to help withstand high temperatures of the gasses passing over the turbine-blade assembly 910. The heat shield 914 includes a body 932, a top surface 934, an outer surface 935, and an inner surface 964, as shown in FIG. 13. The body 932 extends around the spar 930 and forms a portion of the airfoil. The top surface 934 is arranged to interact with the retainer 916. The inner surface 964 is arranged to face towards the spar 930.

The cap 920 includes a flange mount 950, a pressure-side segment, a suction-side segment 953, and a ridge 924 as shown in FIG. 13. In some embodiments, the cap 920 is formed to include a vent aperture 956. The flange mount 950 couples the cap 920 to coupler flange 922. Each of the pressure-side segment and the suction-side segment 953 extends outwardly from the coupler flange 922 to overlie a portion of the heat shield 914. The ridge 924 extends upwardly away from a top surface 960 of the cap 920 to interact with air passing through the gas path.

The suction-side segment 953 cooperates with the platform to locate a portion of the heat shield 914 therebetween as suggested in FIG. 13. The suction-side segment 953 includes a bottom surface 958, a suction-side surface 959, and a top surface 960 as shown in FIG. 13. The bottom surface 958 is arranged to seat against the top surface 934 of the heat shield 914. The suction-side surface 959 is arranged to face an inner surface 971 of the rim 923. In some embodiments, the top surface 960 is formed to include the vent aperture 956. In some embodiments, the suction-side surface 959 is formed to include a groove aperture 970.

An outer surface 963 of the spar 930 cooperates with the inner surface 964 of the heat shield 914 and the bottom surface 958 of the cap 920 to define a portion of the cooling gap 917 as shown in FIG. 13. In some embodiments, the cooling gap 917 is in fluid communication with the vent aperture 956. In some embodiments, the cooling gap 917 is in fluid communication with the groove aperture 970. In some embodiments, the cooling gap 917 is in fluid communication with cooling air coming from the rotor of the gas turbine engine. In some embodiments, cooling air passes from the rotor through the cooling gap 917 and out the vent aperture 956, the groove aperture 970, or a combination thereof.

The rim 923 comprises ceramic materials and is coupled to the heat shield 914 as shown in FIG. 13. The rim 923 includes a heat shield mount 969, the inner surface 971, and an outer surface 978. The heat shield mount 969 is configured to couple the rim 923 to the body 932 of the heat shield 914. The inner surface 971 is arranged to face the suction-side surface 959 of the cap 920. Illustratively, a top surface 977 of the rim 923 is generally coplanar with the top surface 960 of the cap 920. In some embodiments, the top surface 977 extends above the top surface 960 of the cap 920. Illustratively, the heat shield mount 969 is arranged so that the outer surface 978 of the rim 923 is coplanar with an outer surface 935 of the heat shield 914. The inner surface 971 cooperates with the top surface 934 of the heat shield 914 and the suction-side surface 959 to define a vent groove 974. In some embodiments, the vent groove 974 is in fluid communication with the cooling gap 917 and the groove aperture 970. The outer surface 978 is generally coplanar with the outer surface 935 of the heat shield 914.

Figure 14:
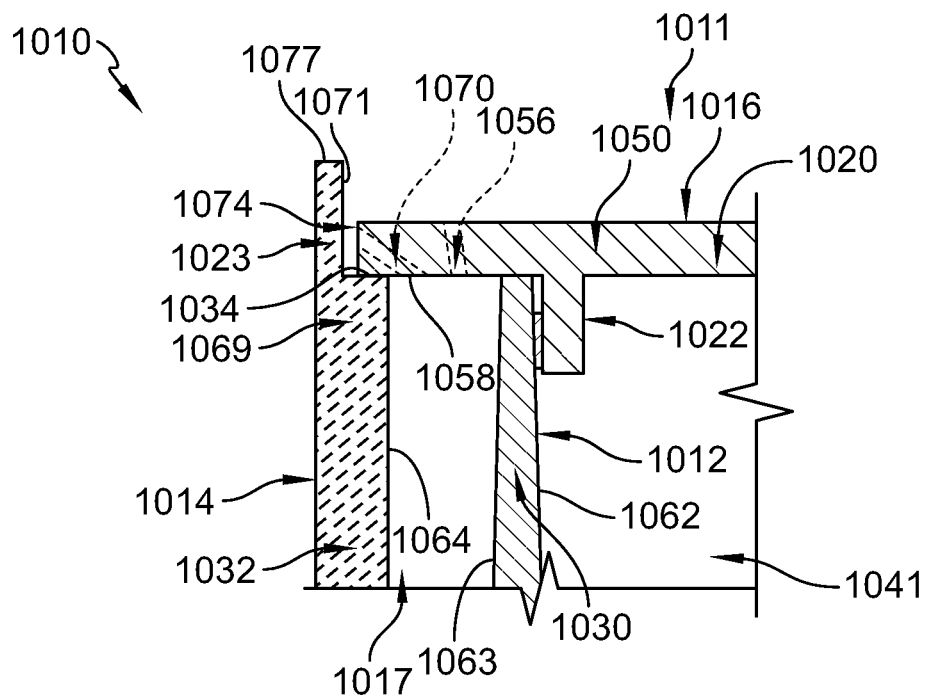
FIG. 14 is a sectional view similar to FIG. 10 of another embodiment of an airfoil in accordance with the present disclosure, showing a rim located spaced-apart from a retainer and coupled to a heat shield to form a vent groove and further showing the rim extending above a top surface of the retainer.

Another illustrative turbine-blade assembly 1010 adapted for use in a gas turbine engine is shown in FIG. 14. The turbine-blade assembly 1010 is substantially similar to the turbine-blade assembly 610 shown in FIGS. 8-10 and described herein. Accordingly, similar reference numbers in the 1000 series indicate features that are common between the turbine-blade assembly 610 and the turbine-blade assembly 1010. The description of the turbine-blade assembly 610 is hereby incorporated by reference to apply to the turbine-blade assembly 1010, except in instances when it conflicts with the specific description and drawings of the turbine-blade assembly 1010.

The turbine-blade assembly 1010 includes an attachment body 1012, a heat shield 1014, a retainer 1016, and a rim 1023 as shown FIG. 14. The attachment body 1012 includes a spar 1030 extends through heat shield 1014 and is configured to couple the turbine-blade assembly 1010 to a gas turbine engine. The heat shield 1014 is arranged to form a portion of an airfoil of the turbine-blade assembly 1010 and interact with hot air passing through the gas turbine engine. The retainer 1016 is configured to retain the heat shield 1014 on the turbine-blade assembly 1010.

The spar 1030 extends through the heat shield 1014 to couple the retainer 1016 to the attachment body 1012 with a bond 1015 as shown in FIG. 14. In some embodiments, the bond 1015 is a braze. In some embodiments, the bond 1015 is a weld. Of course, any suitable bonding technique may be used to couple the spar 1030 with the retainer 1016.

The retainer 1016 comprises metallic materials and includes a cap 1020 and a coupler flange 1022 as shown in FIG. 14. The cap 1020 is located at a distal end 1011 of the turbine-blade assembly 1010 and is arranged to extend over a portion of the heat shield 1014. The coupler flange 1022 extends proximally into a hollow cavity 1041 and is configured to couple the cap 1020 to an inner surface 1062 of the spar 1030 at the distal end 1011 of the turbine-blade assembly 1010.

The heat shield 1014 comprises ceramic materials and is arranged around a portion of the spar 1030 to help withstand high temperatures of the gasses passing over the turbine-blade assembly 1010. The heat shield 1014 includes a body 1032, a top surface 1034, an outer surface 1035, and an inner surface 1064, as shown in FIG. 14. The body 1032 extends around the spar 1030 and forms a portion of the airfoil. The top surface 1034 is arranged to interact with the retainer 1016. The inner surface 1064 is arranged to face towards the spar 1030.

The cap 1020 includes a flange mount 1050, a pressure-side segment, and a suction-side segment 1053 as shown in FIG. 14. In some embodiments, the cap 1020 is formed to include a vent aperture 1056. The flange mount 1050 couples the cap 1020 to coupler flange 1022. Each of the pressure-side segment and the suction-side segment 1053 extends outwardly from the coupler flange 1022 to overlie a portion of the heat shield 1014.

The suction-side segment 1053 cooperates with the platform to locate a portion of the heat shield 1014 therebetween as suggested in FIG. 14. The suction-side segment 1053 includes a bottom surface 1058, a suction-side surface 1059, and a top surface 1060 as shown in FIG. 14. The bottom surface 1058 is arranged to seat against the top surface 1034 of the heat shield 1014. The suction-side surface 1059 is arranged to face an inner surface 1071 of the rim 1023. In some embodiments, the top surface 1060 is formed to include the vent aperture 1056. In some embodiments, the suction-side surface 1059 is formed to include a groove aperture 1070.

An outer surface 1063 of the spar 1030 cooperates with the inner surface 1064 of the heat shield 1014 and the bottom surface 1058 of the cap 1020 to define a portion of the cooling gap 1017 as shown in FIG. 14. In some embodiments, the cooling gap 1017 is in fluid communication with the vent aperture 1056. In some embodiments, the cooling gap 1017 is in fluid communication with the groove aperture 1070. In some embodiments, the cooling gap 1017 is in fluid communication with cooling air coming from the rotor of the gas turbine engine. In some embodiments, cooling air passes from the rotor through the cooling gap 1017 and out the vent aperture 1056, the groove aperture 1070, or a combination thereof.

The rim 1023 comprises ceramic materials and is coupled to the heat shield 1014 as shown in FIG. 14. The rim 1023 includes a heat shield mount 1069, the inner surface 1071, and an outer surface 1078. The heat shield mount 1069 is configured to couple the rim 1023 to the body 1032 of the heat shield 1014. The inner surface 1071 is arranged to face the suction-side surface 1059 of the cap 1020. Illustratively, a top surface 1077 of the rim 1023 extends above the top surface 1060 of the cap 1020. Illustratively, the heat shield mount 1069 is arranged so that the outer surface 1078 is generally coplanar with the outer surface 1035 of the heat shield 1014. The inner surface 1071 cooperates with the top surface 1034 of the heat shield 1014 and the suction-side surface 1059 to define a vent groove 1074. In some embodiments, the vent groove 1074 is in fluid communication with the cooling gap 1017 and the groove aperture 1070.

Figure 15:
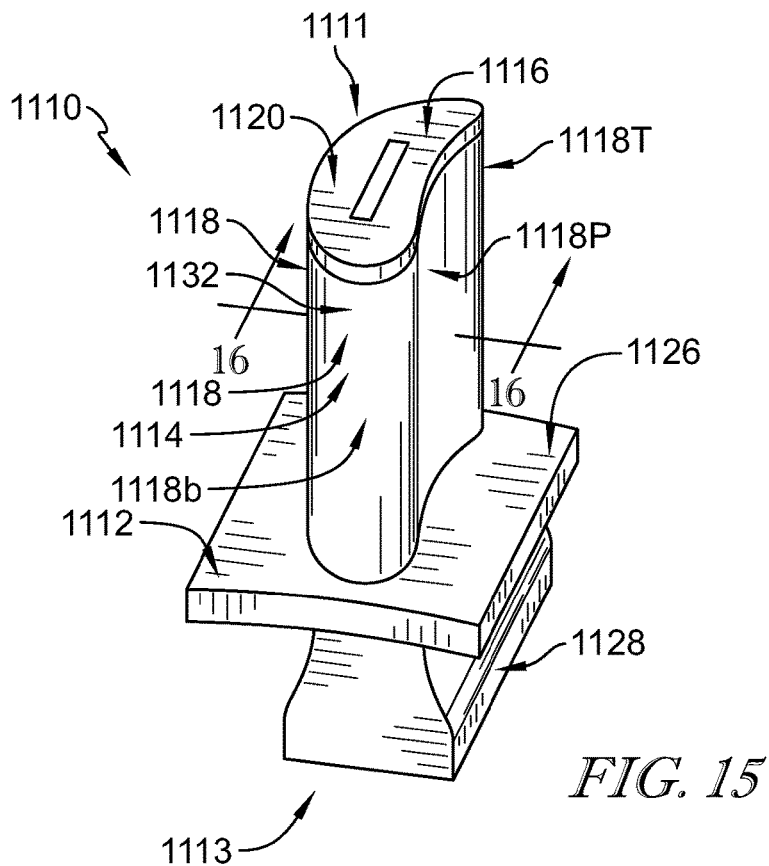
FIG. 15 is a perspective view of another embodiment of a turbine-blade assembly in accordance with the present disclosure showing that the turbine-blade assembly includes a retainer, an attachment body, and a heat shield located between the retainer and the attachment body, and further showing a spar of the attachment body extending through the retainer to couple the retainer to the attachment body.
Figure 16:
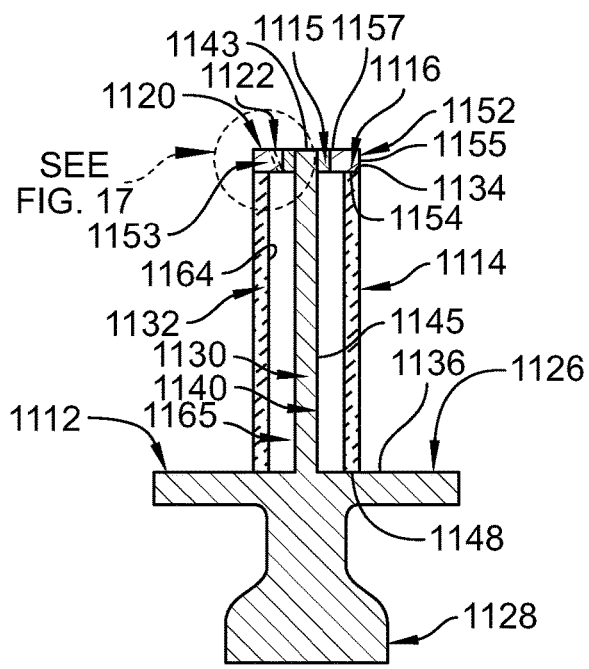
FIG. 16 is a sectional view taken along line 16-16 of FIG. 15, showing the spar extending through the heat shield and the retainer and further showing the heat shield is located between the retainer and the platform.
Figure 17:
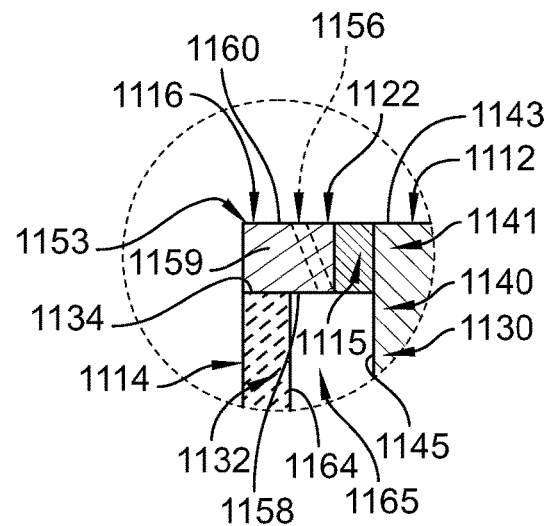
FIG. 17 is a detailed view of a portion of FIG. 16, showing the retainer includes a cap coupled to the spar with a bond and further showing a portion of the cap extending over a top surface of the heat shield.

An illustrative turbine-blade assembly 1110 is shown in FIGS. 15-17. The turbine-blade assembly 1110 includes an attachment body 1112, a heat shield 1114, and a retainer 1116 as shown FIGS. 15-17. Illustratively, the attachment body 1112 is arranged to couple the turbine-blade assembly 1110 to a rotor for rotation about a central axis of a gas turbine engine. The heat shield 1114 is arranged to form a portion of an airfoil 1118 of the turbine-blade assembly 1110 and interact with hot air passing through the gas turbine engine. The retainer 1116 is configured to retain the heat shield 1114 on the turbine-blade assembly 1110.

The retainer 1116 comprises metallic materials and includes a cap 1120 and a spar mount 1122 as shown in FIGS. 16 and 17. The cap 1120 is located at a distal end 1111 of the turbine-blade assembly 1110 and is arranged to extend over the heat shield 1114. The spar mount 1122 is configured to extend around the spar 1130 and couple the cap 1120 to the attachment body 1112 at the distal end 1111 of the turbine-blade assembly 1110.

The attachment body 1112 includes a platform 1126, the root 1128, and a spar 1130, as shown in FIGS. 16 and 17. The platform 1126 extends away outwardly from the spar 1130 and cooperates with the cap 1120 to locate the heat shield 1114 therebetween. The root 1128 is configured to couple the turbine-blade assembly 1110 to the rotor of the gas turbine engine. The spar 1130 extends through the heat shield 1114 and the spar mount 1122 to couple the retainer 1116 to the attachment body 1112 with a bond 1115. In some embodiments, the bond 1115 is a braze. In some embodiments, the bond 1115 is a weld. In some embodiments, the retainer 1116 is bicast with the spar 1130. Of course, any suitable bonding technique may be used to couple the spar 1130 with the retainer 1116.

The heat shield 1114 comprises ceramic materials and is arranged around a portion of the spar 1130 to help withstand high temperatures of the gasses passing over the airfoil 1118. The heat shield 1114 includes a body 1132, a top surface 1134, an outer surface 1135, and a bottom surface 1148, as shown in FIGS. 16-17. The body 1132 extends around the spar 1130 and forms a portion of the airfoil 1118. The top surface 1134 is located radially outward from the bottom surface 148 and is arranged to interact with the retainer 1116. The bottom surface 1148 is located radially inward from the top surface 1134 and is arranged to interact with the platform 1126 of the attachment body 1112.

The heat shield 1114 and the retainer 1116 cooperate to form the airfoil 1118 of the turbine-blade assembly 1110 as shown in FIGS. 16 and 17. The airfoil 1118 includes a leading edge 1118L, a trailing edge 1118T, a pressure side 1118P, and a suction side 1118S as shown in FIGS. 16 and 17. Each of the pressure side 1118P and the suction side 1118S extends from the leading edge 1118L to the trailing edge 1118T.

The platform 1126 includes a top surface 1136 that defines the gas path when the turbine-blade assembly 1110 is in a gas turbine engine, as shown in FIG. 9. The top surface 636 is arranged to interact with the bottom surface 1148 of the heat shield 1114.

The spar 1130 includes a body 1140, a cap mount 1141, top surface 1143, and an outer surface 1145 as shown in FIGS. 16 and 17. The body 1140 extends through the heat shield 1114. The cap mount 1141 is configured to bond to the spar mount 1122 of the cap 1120 so that the top surface 1143 extends through the cap 1120. The outer surface 1145 is arranged to face the inner surface 1164 of the heat shield 1114.

The cap 1120 includes a pressure-side segment 1152 and a suction-side segment 1153 as shown in FIGS. 16 and 17. In some embodiments, the cap 1120 is formed to include a vent aperture 1156. Each of the pressure-side segment 1152 and the suction-side segment 1153 extends outwardly from the spar mount 1122 to overlie the heat shield 1114.

The pressure-side segment 1152 cooperates with the platform 1126 to locate the heat shield 1114 therebetween as shown in FIG. 16. The pressure-side segment 1152 includes a bottom surface 1154, a pressure-side surface 1155, and a top surface 1157 as shown in FIG. 16. The bottom surface 1154 is arranged to seat against the top surface 1134 of the heat shield 1114 as shown in FIG. 17. The pressure-side surface 1155 is generally coplanar with the body 1132 of the heat shield 1114 and forms part of the airfoil 1118. In some embodiments, the top surface 1157 is formed to include the vent aperture 1156. Illustratively, the top surface 1157 of the pressure-side segment 1152 is generally coplanar with the top surface 1143 of the spar 1130

The suction-side segment 1153 cooperates with the platform 1126 to locate the heat shield 1114 therebetween as shown in FIG. 16. The suction-side segment 1153 includes a bottom surface 1158, a suction-side surface 1159, and a top surface 1160 as shown in FIGS. 16 and 17. The bottom surface 1158 is arranged to seat against the top surface 1134 of the heat shield 1114 as shown in FIG. 17. The suction-side surface 1159 is generally coplanar with the body 1132 of the heat shield 1114 and forms part of the airfoil 1118. In some embodiments, the top surface 1160 is formed to include a vent aperture 1156.

The outer surface 1145 of the spar 1130 cooperates with an inner surface 1164 of the heat shield 1114, the bottom surfaces 1154, 1158 of the cap 1120, and the top surface 1136 of the platform 1126 to define a body cavity 1165 as shown in FIGS. 16 and 17. In some embodiments, the body cavity 115 is in fluid communication with the vent aperture 1156. In some embodiments, the body cavity 1165 is in fluid communication with cooling air coming from the rotor of the gas turbine engine. In some embodiments, cooling air passes from the rotor through the body cavity 1165 and out the vent aperture 1156.

In the illustrative embodiment, the heat shield 1114 is a composite adapted to withstand very high operating temperatures that may not be possible for metallic components. More specifically, the heat shield 1114 comprises a ceramic matrix composite (CMC). In some embodiments, the heat shield 1114 is made from a SiC—SiC ceramic matrix composite including a silicon carbide matrix and silicon carbide fibers. For purposes of this application, a ceramic-containing material is any monolithic ceramic or composite in which at least one constituent is a ceramic. Of course, other suitable CMCs or composite combinations may be used.

Figure 18:
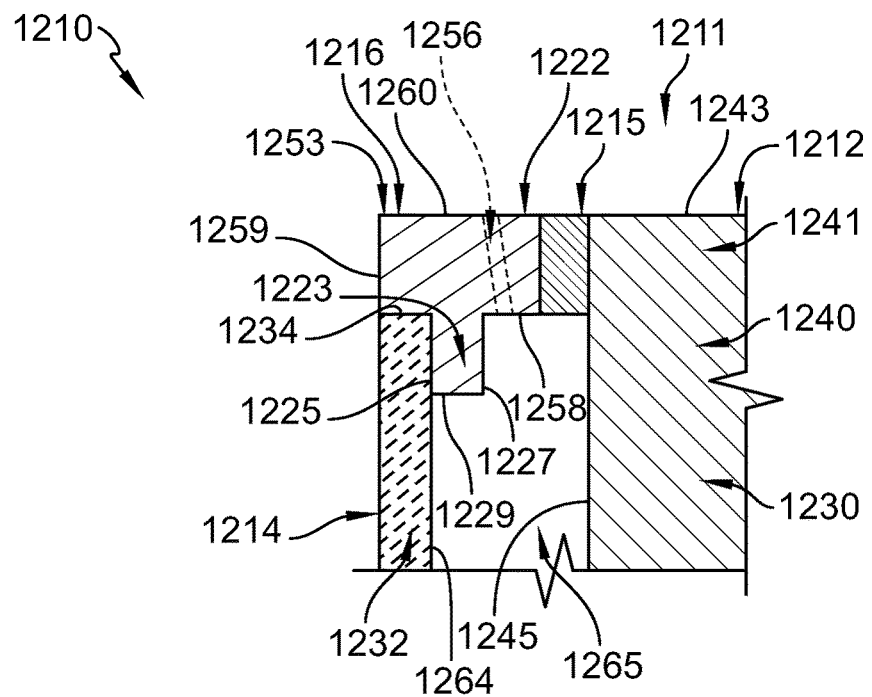
FIG. 18 is a sectional view similar to FIG. 17 of another embodiment of an airfoil in accordance with the present disclosure, showing a heat shield seated against a load pad of a retainer.

Another illustrative turbine-blade assembly 1210 adapted for use in a gas turbine engine is shown in FIG. 18. The turbine-blade assembly 1210 is substantially similar to the turbine-blade assembly 1110 shown in FIGS. 15-17 and described herein. Accordingly, similar reference numbers in the 1200 series indicate features that are common between the turbine-blade assembly 1210 and the turbine-blade assembly 1110. The description of the turbine-blade assembly 1110 is hereby incorporated by reference to apply to the turbine-blade assembly 1210, except in instances when it conflicts with the specific description and drawings of the turbine-blade assembly 1210.

The turbine-blade assembly 1210 includes an attachment body 1212, a heat shield 1214, and a retainer 1216, as shown FIG. 18. The attachment body 1212 is configured to couple the turbine-blade assembly 1210 to a gas turbine engine and includes a spar 1230 that extends through heat shield 1214. The heat shield 1214 is arranged to form a portion of an airfoil of the turbine-blade assembly 1210 and interact with hot air passing through the gas turbine engine. The retainer 1216 is configured to retain the heat shield 1214 on the turbine-blade assembly 1210.

The spar 1230 extends through the heat shield 1214 to couple the retainer 1216 to the attachment body 1212 with a bond 1215 as shown in FIG. 18. In some embodiments, the bond 1215 is a braze. In some embodiments, the bond 1215 is a weld. In some embodiments, the retainer 1216 is bicast with the spar 1230. Of course, any suitable bonding technique may be used to couple the spar 1230 with the retainer 1216.

The retainer 1216 comprises metallic materials and includes a cap 1220 and a spar mount 1222 as shown in FIG. 18. The cap 1220 is located at a distal end 1211 of the turbine-blade assembly 1210 and is arranged to extend over the heat shield 1214. The spar mount 1222 is configured to extend around the spar 1230 and couple the cap 1220 to the attachment body 1212 at the distal end 1211 of the turbine-blade assembly 1210.

The heat shield 1214 comprises ceramic materials and is arranged around a portion of the spar 1230 to help withstand high temperatures of the gasses passing over the turbine-blade assembly 1210. The heat shield 1214 includes a body 1232, a top surface 1234, an outer surface 1235, and an inner surface 1264 as shown in FIG. 18. The body 1232 extends around the spar 1230 and forms a portion of the airfoil. The top surface 1234 is arranged to interact with the retainer 1216. The inner surface 1264 is arranged to face towards the spar 1230.

The cap 1220 includes a pressure-side segment and a suction-side segment 1253 as shown in FIG. 18. In some embodiments, the cap 1220 is formed to include a vent aperture 1256. Each of the pressure-side segment and the suction-side segment 1253 extends outwardly from the spar mount 1222 to overlie the heat shield 1214.

The suction-side segment 1253 cooperates with the platform to locate the heat shield 1214 therebetween as suggested in FIG. 18. The suction-side segment 1253 includes a bottom surface 1258, a suction-side surface 1259, a top surface 1260, and the load pad 1223 as shown in FIG. 18. The bottom surface 1258 is arranged to seat against the top surface 1234 of the heat shield 1214 as shown in FIG. 18. The suction-side surface 1259 is arranged to be coplanar with the body 1232 of the heat shield 1214 and forms part of the airfoil. In some embodiments, the top surface 1260 is formed to include the vent aperture 1256. The load pad 1223 extends from the bottom surface 1258 into a body cavity 1265.

The load pad 1223 includes an outer surface 1275, an inner surface 1227, and a bottom surface 1229 as shown in FIG. 18. The outer surface 1225 is configured to support the heat shield 1214. The inner surface 1227 faces the spar 1230. The bottom surface 1229 extends between and interconnects the outer surface 1225 and the inner surface 1227.

An outer surface 1245 of the spar 1230 cooperates with the inner surface 1264 of the heat shield 1214 and the bottom surface 1258 of the cap 1220 to define a portion of the body cavity 1265 as shown in FIG. 18. In some embodiments, the body cavity 1265 is in fluid communication with the vent aperture 1256. In some embodiments, the body cavity 1265 is in fluid communication with cooling air coming from the rotor of the gas turbine engine. In some embodiments, cooling air passes from the rotor through the body cavity 1265 and out the vent aperture 1256.

Figure 19:
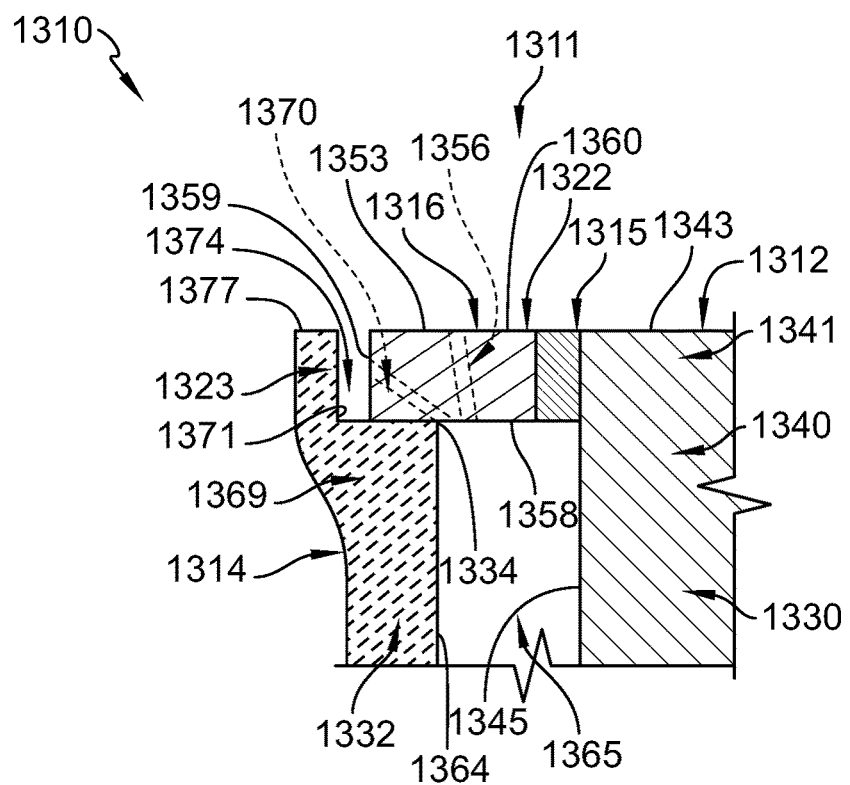
FIG. 19 is a sectional view similar to FIG. 17 of another embodiment of an airfoil in accordance with the present disclosure, showing a rim located spaced-apart from a retainer and coupled to a heat shield to form a vent groove and a top surface of the rim is coplanar with a top surface of the retainer.

Another illustrative turbine-blade assembly 1310 adapted for use in a gas turbine engine is shown in FIG. 19. The turbine-blade assembly 1310 is substantially similar to the turbine-blade assembly 1110 shown in FIGS. 15-17 and described herein. Accordingly, similar reference numbers in the 1300 series indicate features that are common between the turbine-blade assembly 1110 and the turbine-blade assembly 1310. The description of the turbine-blade assembly 1110 is hereby incorporated by reference to apply to the turbine-blade assembly 1310, except in instances when it conflicts with the specific description and drawings of the turbine-blade assembly 1310.

The turbine-blade assembly 1310 includes an attachment body 1312, a heat shield 1314, a retainer 1316, and a rim 1323, as shown FIG. 19. The attachment body 1312 is configured to couple the turbine-blade assembly 1310 to a gas turbine engine and includes a spar 1330 that extends through heat shield 1314. The heat shield 1314 is arranged to form a portion of an airfoil of the turbine-blade assembly 1310 and interact with hot air passing through the gas turbine engine. The retainer 1316 is configured to retain the heat shield 1314 on the turbine-blade assembly 1310. The rim 1323 is coupled to the heat shield 1314 and is located spaced-apart from the retainer 1316.

The spar 1330 extends through the heat shield 1314 to couple the retainer 1316 to the attachment body 1312 with a bond 1315 as shown in FIG. 19. In some embodiments, the bond 1315 is a braze. In some embodiments, the bond 1315 is a weld. In some embodiments, the retainer 1316 is bicast with the spar 1330. Of course, any suitable bonding technique may be used to couple the spar 1330 with the retainer 1316.

The retainer 1316 comprises metallic materials and includes a cap 1320 and a spar mount 1322 as shown in FIG.

19. The cap 1320 is located at a distal end 1311 of the turbine-blade assembly 1310 and is arranged to extend over the heat shield 1314. The spar mount 1322 is configured to extend around the spar 1330 and couple the cap 1320 to the attachment body 1312 at the distal end 1311 of the turbine-blade assembly 1310.

The heat shield 1314 comprises ceramic materials and is arranged around a portion of the spar 1330 to help withstand high temperatures of the gasses passing over the turbine-blade assembly 1310. The heat shield 1314 includes a body 1332, a top surface 1334, an outer surface 1335, and an inner surface 1364 as shown in FIG. 19. The body 1332 extends around the spar 1330 and forms a portion of the airfoil. The top surface 1334 is arranged to interact with the retainer 1316. The inner surface 1364 is arranged to face towards the spar 1330.

The cap 1320 includes a pressure-side segment and a suction-side segment 1353 as shown in FIG. 19. In some embodiments, the cap 1320 is formed to include a vent aperture 1356. In some embodiments, the cap 1320 is formed to include a groove aperture 1370. Each of the pressure-side segment and the suction-side segment 1353 extends outwardly from the spar mount 1322 to overlie a portion of the heat shield 1314.

The suction-side segment 1353 cooperates with the platform to locate a portion of the heat shield 1314 therebetween as suggested in FIG. 19. The suction-side segment 1353 includes a bottom surface 1358, a suction-side surface 1359, and a top surface 1360 as shown in FIG. 19. The bottom surface 1358 is arranged to seat against the top surface 1334 of the heat shield 1314. The suction-side surface 1359 is arranged to face an inner surface 1371 of the rim 1323. In some embodiments, the top surface 1360 is formed to include the vent aperture 1356. In some embodiments, the suction-side surface 1359 is formed to include a groove aperture 1370.

An outer surface 1345 of the spar 1330 cooperates with the inner surface 1364 of the heat shield 1314 and the bottom surface 1358 of the cap 1320 to define a portion of the body cavity 1365 as shown in FIG. 19. In some embodiments, the body cavity 1365 is in fluid communication with the vent aperture 1356. In some embodiments, the body cavity 1365 is in fluid communication with the groove aperture 1370. In some embodiments, the body cavity 1365 is in fluid communication with cooling air coming from the rotor of the gas turbine engine. In some embodiments, cooling air passes from the rotor through the body cavity 1365 and out the vent aperture 1356, the groove aperture 1370, or a combination thereof.

The rim 1323 comprises ceramic materials and is coupled to the heat shield 1314 as shown in FIG. 19. The rim 1323 includes a heat shield mount 1369, an outer surface 1378, and the inner surface 1371. The heat shield mount 1369 is configured to couple the rim 1323 to the body 1332 of the heat shield 1314. The inner surface 1371 is arranged to face the suction-side surface 1359 of the cap 1320. Illustratively, a top surface 1377 of the rim 1323 is generally coplanar with the top surface 1360 of the cap 1320. In some embodiments, the heat shield mount 1369 extends outwardly from the body 1332 of the heat shield 1314. In some embodiments, the top surface 1377 extends above the top surface 1360 of the cap 1320. The inner surface 1371 cooperates with the top surface 1334 of the heat shield 1314 and the suction-side surface 1359 to define a vent groove 1374. In some embodiments, the vent groove 1374 is in fluid communication with the body cavity 1365 and the groove aperture 1370. The outer surface 1378 is located outward axially from the outer surface 1335 of the heat shield 1314.

Figure 20:
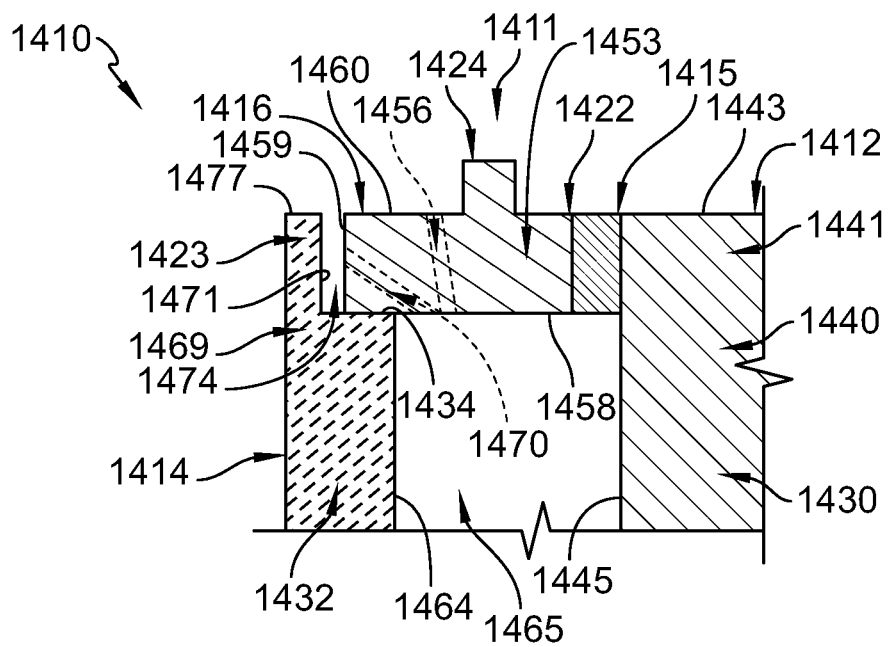
FIG. 20 is a sectional view similar to FIG. 17 of another embodiment of an airfoil in accordance with the present disclosure, showing a retainer includes a ridge extending from a top surface of the retainer.

Another illustrative turbine-blade assembly 1410 adapted for use in a gas turbine engine is shown in FIG. 20. The turbine-blade assembly 1410 is substantially similar to the turbine-blade assembly 1110 shown in FIGS. 15-17 and described herein. Accordingly, similar reference numbers in the 1400 series indicate features that are common between the turbine-blade assembly 1110 and the turbine-blade assembly 1410. The description of the turbine-blade assembly 1110 is hereby incorporated by reference to apply to the turbine-blade assembly 1410, except in instances when it conflicts with the specific description and drawings of the turbine-blade assembly 1410.

The turbine-blade assembly 1410 includes an attachment body 1412, a heat shield 1414, a retainer 1416, and a rim 1423, as shown FIG. 20. The attachment body 1412 is configured to couple the turbine-blade assembly 1410 to a gas turbine engine and includes a spar 1430 that extends through heat shield 1414. The heat shield 1414 is arranged to form a portion of an airfoil of the turbine-blade assembly 1410 and interact with hot air passing through the gas turbine engine. The retainer 1416 is configured to retain the heat shield 1414 on the turbine-blade assembly 1410. The rim 1423 is coupled to the heat shield 1414 and is located spaced-apart from the retainer 1416.

The spar 1430 extends through the heat shield 1414 to couple the retainer 1416 to the attachment body 1412 with a bond 1415 as shown in FIG. 20. In some embodiments, the bond 1415 is a braze. In some embodiments, the bond 1415 is a weld. In some embodiments, the retainer 1416 is bicast with the spar 1430. Of course, any suitable bonding technique may be used to couple the spar 1430 with the retainer 1416.

The retainer 1416 comprises metallic materials and includes a cap 1420 and a spar mount 1422 as shown in FIG. 20. The cap 1420 is located at a distal end 1411 of the turbine-blade assembly 1410 and is arranged to extend over the heat shield 1414. The spar mount 1422 is configured to extend around the spar 1430 and couple the cap 1420 to the attachment body 1412 at the distal end 1411 of the turbine-blade assembly 1410.

The heat shield 1414 comprises ceramic materials and is arranged around a portion of the spar 1430 to help withstand high temperatures of the gasses passing over the turbine-blade assembly 1410. The heat shield 1414 includes a body 1432, a top surface 1434, an outer surface 1435, and an inner surface 1464 as shown in FIG. 20. The body 1432 extends around the spar 1430 and forms a portion of the airfoil. The top surface 1434 is arranged to interact with the retainer 1416. The inner surface 1464 is arranged to face towards the spar 1430.

The cap 1420 includes a pressure-side segment, a ridge 1424, and a suction-side segment 1453 as shown in FIG. 20. In some embodiments, the cap 1420 is formed to include a vent aperture 1456. In some embodiments, the cap 1420 is formed to include a groove aperture 1470. Each of the pressure-side segment and the suction-side segment 1453 extends outwardly from the spar mount 1422 to overlie a portion of the heat shield 1414. The ridge 1424 extends upwardly away from a top surface 1460 of the cap 1420 to interact with air passing through the gas path.

The suction-side segment 1453 cooperates with the platform to locate a portion of the heat shield 1414 therebetween as suggested in FIG. 20. The suction-side segment 1453 includes a bottom surface 1458, a suction-side surface 1459, and a top surface 1460 as shown in FIG. 20. The bottom surface 1458 is arranged to seat against the top surface 1434 of the heat shield 1414. The suction-side surface 1459 is arranged to face an inner surface 1471 of the rim 1423. In some embodiments, the top surface 1460 is formed to include the vent aperture 1456. In some embodiments, the suction-side surface 1459 is formed to include a groove aperture 1470.

An outer surface 1445 of the spar 1430 cooperates with the inner surface 1464 of the heat shield 1414 and the bottom surface 1458 of the cap 1420 to define a portion of the body cavity 1465 as shown in FIG. 20. In some embodiments, the body cavity 1465 is in fluid communication with the vent aperture 1456. In some embodiments, the body cavity 1465 is in fluid communication with the groove aperture 1470. In some embodiments, the body cavity 1465 is in fluid communication with cooling air coming from the rotor of the gas turbine engine. In some embodiments, cooling air passes from the rotor through the body cavity 1465 and out the vent aperture 1456, the groove aperture 1470, or a combination thereof.

The rim 1423 comprises ceramic materials and is coupled to the heat shield 1414 as shown in FIG. 20. The rim 1423 includes a heat shield mount 1469, an outer surface 1478, and the inner surface 1471. The heat shield mount 1469 is configured to couple the rim 1423 to the body 1432 of the heat shield 1414. Illustratively, the heat shield mount 1469 is arranged so that the outer surface 1478 of the rim 1423 is coplanar with the body 1432 of the heat shield 1414. The inner surface 1471 is arranged to face the suction-side surface 1459 of the cap 14. Illustratively, a top surface 1477 of the rim 1423 is generally coplanar with the top surface 1460 of the cap 1420. In some embodiments, the top surface 1477 extends above the top surface 1460 of the cap 1420. The inner surface 1471 cooperates with the top surface 1434 of the heat shield 1414 and the suction-side surface 1459 to define a vent groove 1474. In some embodiments, the vent groove 1474 is in fluid communication with the cooling gap 1417 and the groove aperture 1470.

Figure 21:
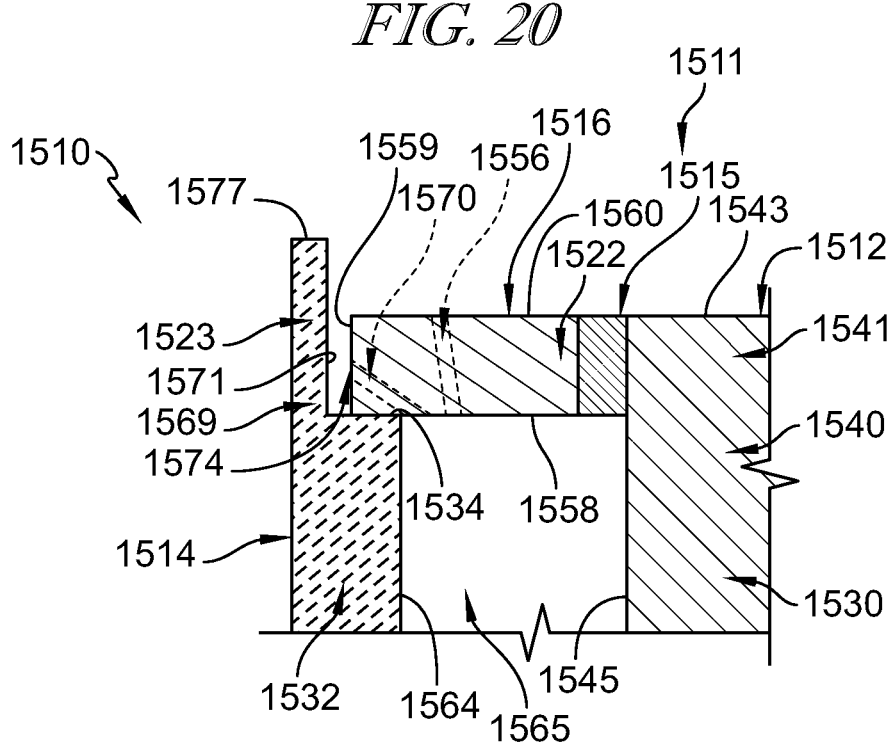
FIG. 21 is a sectional view similar to FIG. 17 of another embodiment of an airfoil in accordance with the present disclosure, showing a rim located spaced-apart from a retainer and coupled to a heat shield to form a vent groove, and further showing a top surface of the rim extending above a top surface of the retainer.

Another illustrative turbine-blade assembly 1510 adapted for use in a gas turbine engine is shown in FIG. 21. The turbine-blade assembly 1510 is substantially similar to the turbine-blade assembly 1110 shown in FIGS. 15-17 and described herein. Accordingly, similar reference numbers in the 1500 series indicate features that are common between the turbine-blade assembly 1110 and the turbine-blade assembly 1510. The description of the turbine-blade assembly 1110 is hereby incorporated by reference to apply to the turbine-blade assembly 1510, except in instances when it conflicts with the specific description and drawings of the turbine-blade assembly 1510.

The turbine-blade assembly 1510 includes an attachment body 1512, a heat shield 1514, a retainer 1516, and a rim 1523, as shown FIG. 21. The attachment body 1512 is configured to couple the turbine-blade assembly 1510 to a gas turbine engine and includes a spar 1530 that extends through heat shield 1514. The heat shield 1514 is arranged to form a portion of an airfoil of the turbine-blade assembly 1510 and interact with hot air passing through the gas turbine engine. The retainer 1516 is configured to retain the heat shield 1514 on the turbine-blade assembly 1510. The rim 1523 is coupled to the heat shield 1514 and is located spaced-apart from the retainer 1516.

The spar 1530 extends through the heat shield 1514 to couple the retainer 1516 to the attachment body 1512 with a bond 1515 as shown in FIG. 21. In some embodiments, the bond 1515 is a braze. In some embodiments, the bond 1515 is a weld. In some embodiments, the retainer 1516 is bicast with the spar 1530. Of course, any suitable bonding technique may be used to couple the spar 1530 with the retainer 1516.

The retainer 1516 comprises metallic materials and includes a cap 1520 and a spar mount 1522 as shown in FIG. 21. The cap 1520 is located at a distal end 1511 of the turbine-blade assembly 1510 and is arranged to extend over the heat shield 1514. The spar mount 1522 is configured to extend around the spar 1530 and couple the cap 1520 to the attachment body 1512 at the distal end 1511 of the turbine-blade assembly 1510.

The heat shield 1514 comprises ceramic materials and is arranged around a portion of the spar 1530 to help withstand high temperatures of the gasses passing over the turbine-blade assembly 1510. The heat shield 1514 includes a body 1532, a top surface 1534, an outer surface 1535, and an inner surface 1564 as shown in FIG. 21. The body 1532 extends around the spar 1530 and forms a portion of the airfoil. The top surface 1534 is arranged to interact with the retainer 1516. The inner surface 1564 is arranged to face towards the spar 1530.

The cap 1520 includes a pressure-side segment, a ridge 1524, and a suction-side segment 1553 as shown in FIG. 21. In some embodiments, the cap 1520 is formed to include a vent aperture 1556. In some embodiments, the cap 1520 is formed to include a groove aperture 1570. Each of the pressure-side segment and the suction-side segment 1553 extends outwardly from the spar mount 1522 to overlie a portion of the heat shield 1514. The ridge 1524 extends upwardly away from a top surface 1560 of the cap 1520 to interact with air passing through the gas path.

The suction-side segment 1553 cooperates with the platform to locate a portion of the heat shield 1514 therebetween as suggested in FIG. 21. The suction-side segment 1553 includes a bottom surface 1558, a suction-side surface 1559, and a top surface 1560 as shown in FIG. 21. The bottom surface 1558 is arranged to seat against the top surface 1534 of the heat shield 1514. The suction-side surface 1559 is arranged to face an inner surface 1571 of the rim 1523. In some embodiments, the top surface 1560 is formed to include the vent aperture 1556. In some embodiments, the suction-side surface 1559 is formed to include a groove aperture 1570.

An outer surface 1545 of the spar 1530 cooperates with the inner surface 1564 of the heat shield 1514 and the bottom surface 1458 of the cap 1520 to define a portion of the body cavity 1565 as shown in FIG. 21. In some embodiments, the body cavity 1565 is in fluid communication with the vent aperture 1556. In some embodiments, the body cavity 1565 is in fluid communication with the groove aperture 1570. In some embodiments, the body cavity 1565 is in fluid communication with cooling air coming from the rotor of the gas turbine engine. In some embodiments, cooling air passes from the rotor through the body cavity 1565 and out the vent aperture 1556, the groove aperture 1570, or a combination thereof.

The rim 1523 comprises ceramic materials and is coupled to the heat shield 1514 as shown in FIG. 21. The rim 1523 includes a heat shield mount 1569, an outer surface 1578, and the inner surface 1571. The heat shield mount 1569 is configured to couple the rim 1523 to the body 1532 of the heat shield 1514. Illustratively, the heat shield mount 1569 is arranged so that the outer surface 1578 of the rim 1523 is generally coplanar with the outer surface 1535 of the heat shield 1514. The inner surface 1571 is arranged to face the suction-side surface 1559 of the cap 1520. Illustratively, a top surface 1577 of the rim 1523 is generally coplanar with the top surface 1560 of the cap 1520. In some embodiments, the top surface 1577 extends above the top surface 1560 of the cap 1520. The inner surface 1571 cooperates with the top surface 1534 of the heat shield 1514 and the suction-side surface 1559 to define a vent groove 1574. In some embodiments, the vent groove 1574 is in fluid communication with the cooling gap 1517 and the groove aperture 1570. The outer surface 1578 is generally coplanar with the outer surface 1535 of the heat shield 1514.

In some embodiments, the turbine-blade assembly design may enable the use of a hollow, CMC airfoil (i.e. the airfoil 18), but the balance of the blade (i.e. the attachment body 12 and/or the retainer 16) may comprise metal, CMC, or a combination of these materials. In one example, the metal may be a high-temperature nickel alloy. In some embodiments, a CMC airfoil (i.e. the turbine-blade assembly 10) is formed with the balance of blade components (i.e. the turbine-blade assembly 10) comprising metallic materials. In this way, a traditional metal dovetail attachment scheme can be metal. The platform (i.e. the platform 26) may comprise metallic materials and be integral with the metal spar and dovetail.

In some embodiments, a turbine-blade assembly (i.e. the turbine-blade assembly 10) may comprise a CMC platform (i.e. the platform 26) that is a separate piece, sandwiched between the airfoil and the dovetail.

In some embodiments, the end cap (i.e. the retainer 16) comprises metallic materials. In some embodiments, the end cap (i.e. the retainer 16) may comprise a CMC. In some illustrative embodiments, an end cap (i.e. the retainer 16) is used rather than having the tip integral with the spar (i.e. the spar 22) and the spar (i.e. the spar 22) then fastened to a separate dovetail piece (i.e. the root segments 42, 43) because it places the minimum amount of load through the interface joint.

There are several possible attachments for the end cap (i.e. the retainer 16). In some embodiments, the end cap (i.e. the retainer 16) may be bicast to the spar (i.e. the spar 22) to form a no-clearance assembly. In another embodiment, the end cap (i.e. the retainer 16) may be brazed to the spar (i.e. the spar 22). Considering the centripetal loads, a retaining ring or pin (i.e. the fastener 30) may produce a more robust joint while brazing. By combining a mechanical connection and a braze connection, clearances would be minimized. This would be beneficial for air system reasons (stops leaks), to share the load passing through the joint, and to avoid possible relative motion resulting in wear.

In some embodiments, the end cap (i.e. the retainer 16) may be integral with the spar (i.e. the spar 22) and assemble separate dovetail/platform pieces (i.e. the root segments 42, 43) on either side of the spar (i.e. the spar 22). In metal, these pieces at the attachment area may be welded, brazed, pinned together, or combinations thereof.

A metal/CMC hybrid assembly may allow air to be fed up through the attachment into the interior cavity (i.e. the body cavity 65) for cooling. The air could then be allowed to leak out the assembly gaps. Alternatively, the air could leak out the assembly gaps and through cooling holes (i.e. the vent aperture 56) or slots in the airfoil, ends, and/or platforms. Alternatively, the gaps could be sealed such that the cooling air would only flow out cooling holes in the airfoil (i.e. the vent aperture 56), ends, and/or platforms.

In some embodiments, the retainer and the attachment body comprise CMC materials. Illustratively, the pieces (i.e. the heat shield, the attachment body, and the retainer) would undergo CVI processing independently, but would be assembled together and co-processed through the SMI process for an integrally formed CMC blade. In some embodiments, the end cap (i.e. the retainer) is integral with the spar while the attachment (i.e. the root) and platform (i.e. the platform) is formed via two separate dovetail pieces assembled on either side of the spar. The reason for this is to provide a strong, integral joint at the end cap as fibers flow from the spar to the end cap. The weaker assembly joint has been moved to the attachment, where there is room to enhance the joint strength via pins. The basic concept is to have CMC pins with fibers running axially along the pins. In this way, once co-processed, there will be fiber spanning the interface between the spar and dovetail attachment pieces. Co-processed CMC pins have the benefit of a zero clearance joint and a matching coefficient of thermal expansion.

There could be alternate methods of processing such that some, but not all the parts of the turbine-blade assembly are SMI co-processed at the same time. For instance, the airfoil could be fully processed prior to the assembly being co-processed together.

In some embodiments, the pins (i.e. the fastener 30) may comprise a metallic material. In some embodiments, the pins (i.e. the fastener 30) is hollow such as a split roll-pin or a spiral roll-pin to alleviate the thermal expansion concern by allowing radial flexibility while maintaining bending and shear strength.

In some embodiments, the airfoil may be a separate piece. This arrangement may alleviate the thermal expansion differences between the spar (i.e. the spar 22) and the airfoil (i.e. the airfoil 18) as the airfoil (i.e. the airfoil 18) heats up while the spar (i.e. the spar 22) is still cool.

In some embodiments, non-traditional turbine blade/vane materials may be used for the flow path material while utilizing high strength nickel based super alloys for the spar (i.e. the spar 22 or the retainer 16).

In some embodiments, weight reduction may be achieved by using low-density sheath materials such as CMC or monolithic ceramics.

In some embodiments, a flow path surface (i.e. the heat shield 14 or the platform 26) may be replaced without having to replace the spar (i.e. the spar 22). In a blisk type application, it would make the blisk reparable.

In some embodiments, the flow path surface (i.e. the heat shield 14) is disconnected from the spar (i.e. the spar 22) to minimize relative thermal growth problems between the hot flow path and relatively cool spar (i.e. the spar 22).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine-blade assembly adapted for use in a gas turbine engine, the turbine-blade assembly comprising
    an attachment body comprising metallic material and configured to couple the turbine-blade assembly to a disk of a turbine rotor, the attachment body formed to include a platform and at least a portion of a root,
    a heat shield comprising ceramic materials and shaped to form a portion of an airfoil,
    a retainer including a cap, a spar coupled to the cap and extending through the heat shield, and a stem coupled to the spar and configured to form part of the root, wherein the cap cooperates with the platform to locate the heat shield therebetween and to retain the heat shield relative to the root, and a rim coupled with the heat shield, the rim extends outwardly away from the heat shield and the platform such that a top surface of the rim is located outwardly of a top surface of the cap so that the rim is configured to act as a squealer tip of the turbine-blade assembly, wherein an inner surface of the rim is spaced apart from a side surface of the cap so that the rim cooperates with the cap of the retainer and the heat shield to define a vent groove there between.

2. The turbine-blade assembly of claim 1, wherein the cap is arranged to overlie a portion of the heat shield to locate the portion of the heat shield between a bottom surface of the cap and a top surface of the platform.

3. The turbine-blade assembly of claim 2, wherein the bottom surface of the cap cooperates with the top surface of the platform, an inner surface of the heat shield, and an outer surface of the spar to define a cavity.

4. The turbine-blade assembly of claim 3, wherein the retainer is formed to include a vent aperture in fluid communication with the cavity.

5. The turbine-blade assembly of claim 4, wherein the cavity is in fluid communication with a rotor when the turbine-blade assembly is in the gas turbine engine to receive cooling air from elsewhere in the gas turbine engine.

6. The turbine-blade assembly of claim 1, wherein the attachment body includes a first part and a second part arranged to locate a portion of the retainer therebetween.

7. The turbine-blade assembly of claim 6, wherein each of the first part and the second part are formed to include an aperture sized to receive a dowel that extends from the first part through the retainer to the second part.

8. The turbine-blade assembly of claim 1, wherein an inner surface of the rim is generally coplanar with an outer surface of the heat shield.

9. The turbine-blade assembly of claim 1, wherein an outer surface of the rim is generally coplanar with an outer surface of the heat shield.

10. The turbine-blade assembly of claim 9, wherein the cap is formed to include a groove aperture that opens into the vent groove to carry cooling air into the vent groove.

11. A method of assembling a turbine-blade assembly including an airfoil and an attachment body for use in a gas turbine engine, the method comprising
arranging a ceramic heat shield around a portion of a metallic spar to cause the heat shield to surround the metallic spar, the ceramic heat shield shaped to form at least a portion of an airfoil, and
coupling a retainer to the attachment body to locate the ceramic heat shield between the retainer and a platform of the attachment body, the attachment body formed to include a platform and at least a portion of a root,
wherein the retainer includes a cap, the metallic spar that is coupled to the cap, and a stem coupled to the spar and configured to form part of the root, the cap cooperates with the platform to locate the heat shield therebetween and to retain the heat shield relative to the root, and the turbine-blade assembly further includes a rim coupled with the heat shield, the rim extends outwardly away from the heat shield and the platform such that a top surface of the rim is located outwardly of a top surface of the cap to act as a squealer tip and wherein an inner surface of the rim is spaced apart from a side surface of the cap so that the rim cooperates with the cap of the retainer and the heat shield to define a vent groove there between, and
wherein the method further includes rotating the turbine-blade assembly about an axis and rubbing the top surface of the rim on a turbine shroud in response to rotation of the turbine-blade assembly about the axis.

12. The method of claim 11, wherein the step of coupling includes bicasting the retainer with the spar.

13. The method of claim 11, wherein the retainer is formed to include a spar mount configured to receive the spar therethrough and the step of coupling includes brazing the spar with the retainer.

14. A turbine-blade assembly adapted for use in a gas turbine engine, the turbine-blade assembly comprising
an attachment body comprising metallic material and configured to couple the turbine-blade assembly to a disk of a turbine rotor, the attachment body formed to include a platform and at least a portion of a root,
a heat shield comprising ceramic materials and shaped to form a portion of an airfoil, and
a retainer including a cap, a spar coupled to the cap and extending through the heat shield, and a stem coupled to the spar and configured to form part of the root, wherein the cap cooperates with the platform to locate the heat shield therebetween and to retain the heat shield relative to the root,
wherein the cap is arranged to overlie the heat shield to locate the heat shield between a bottom surface of the cap and a top surface of the platform,
wherein the cap includes a load pad extending downwardly from the bottom surface of the cap and configured to contact the heat shield to locate the heat shield relative to the spar, the load pad includes an outer surface that extends downwardly from the bottom surface of the cap and engages the heat shield, an inner surfaces that faces the spar, and a bottom surface that extends between and interconnects the outer surface and the inner surface,
wherein the cap includes a bottom surface and a side surface that extends between and interconnects the top surface and the bottom surface of the cap, the heat shield includes an outer surface that faces away from the spar, and the side surface of the cap and the outer surface of the heat shield are coplanar to form a portion of the airfoil configured to interact with hot gas passing through the gas turbine engine.

15. The turbine-blade assembly of claim 14, wherein the heat shield includes a top surface connected with the outer surface of the heat shield and the top surface of the heat shield directly engages the bottom surface of the cap.

16. The turbine-blade assembly of claim 10, wherein the cap is arranged to overlie at least a portion of the heat shield to locate the portion of the heat shield between a bottom surface of the cap and a top surface of the platform, the bottom surface of the cap cooperates with the top surface of the platform, an inner surface of the heat shield, and an outer surface of the spar to define a cavity, and the cap is formed to define an aperture that extends through the cap to fluidly connect directly the vent groove and the cavity.

\* \* \* \* \*